US012769605B2

(12) United States Patent
Mo et al.

(10) Patent No.: US 12,769,605 B2
(45) Date of Patent: Oct. 20, 2026

(54) TRACE CLASSIFICATION AND LOG ASSOCIATION FOR DISTRIBUTED SYSTEM TROUBLESHOOTING

(71) Applicant: INTERNATIONAL BUSINESS MACHINES CORPORATION, Armonk, NY (US)

(72) Inventors: Ying Mo, San Jose, CA (US); Rui Liu, Beijing (CN); Yue Chen, Beijing (CN); Ya Xiao, Beijing (CN); Hu Wang, Beijng (CN); Simao Liu, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/957,841

(22) Filed: Nov. 24, 2024

(65) Prior Publication Data

US 2026/0147658 A1 May 28, 2026

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ........................... G06F 11/079; G06F 11/0721
USPC ........................................................ 714/1–57
See application file for complete search history.

(56) References Cited

U.S. PATENT DOCUMENTS

2014/0173358 A1* 6/2014 Burghard ............ G06F 11/0706 714/45
2015/0242296 A1* 8/2015 Mittal ................. G06F 11/3476 714/37
2016/0110238 A1* 4/2016 Burugula ............ G06F 11/0787 714/38.11
2019/0042386 A1* 2/2019 Barczak ................ G06F 3/0632
2019/0095417 A1* 3/2019 Xu ........................ G06F 40/211
2019/0303266 A1* 10/2019 Bonnell ................ G06F 11/302
2020/0349112 A1* 11/2020 Apurva ................... G06F 16/16
2021/0248023 A1* 8/2021 Brown .................. G06F 11/302
2022/0129550 A1* 4/2022 Olivier .................. G06F 21/561
2022/0335013 A1* 10/2022 Ciubotariu .......... G06F 16/1744
(Continued)

FOREIGN PATENT DOCUMENTS

WO 2023110059 A1 6/2023

OTHER PUBLICATIONS

"Correlate Logs and Traces", Datadog, 2025, 3 pages.
(Continued)

*Primary Examiner* — Sarai E Butler
(74) *Attorney, Agent, or Firm* — CHIP LAW GROUP

(57) ABSTRACT

Provided are techniques for a troubleshooting system. Selection of a trace is received. The trace is associated with raw log lines. A trace category of the trace is identified, where the
(Continued)

trace category is associated with a common log lines template. Common log lines are generated by removing log lines from the raw log lines that do not appear in the common log lines template. One or more relevant trace categories and one or more relevant traces are identified. A problem is identified using the trace, the common log lines, the one or more relevant trace categories, and the one or more relevant traces. A solution for the problem is implemented.

20 Claims, 21 Drawing Sheets

(56) References Cited

U.S. PATENT DOCUMENTS

| | | | | |
|---|---|---|---|---|
| 2023/0091197 | A1* | 3/2023 | Edwards | G05B 23/0254 714/37 |
| 2024/0241764 | A1* | 7/2024 | Jha | G06F 9/5072 |
| 2024/0264992 | A1* | 8/2024 | Fukuda | G06F 11/34 |
| 2024/0330446 | A1* | 10/2024 | Bulut | G06N 3/0895 |
| 2025/0110854 | A1* | 4/2025 | Chandramohan | G06F 11/3636 |
| 2025/0181444 | A1* | 6/2025 | Nigudkar | G06F 11/0709 |
| 2025/0251916 | A1* | 8/2025 | Lawler | G06F 8/35 |

OTHER PUBLICATIONS

"Java Log Collection", Datadog, 2024, 7 pages.

"OpenTelemetry Logging: How It Works and 4 Code Examples", Lumigo, retrieved from web https://lumigo.io/opentelemetry/opentelemetry-logging-how-it-works-and-4-code-examples/, dated Sep. 13, 2024, 13 pages.

Jennifer Alice Cutinha. "Classification of Anomalous Traces in Audit Logs Using Next Activity Prediction", Deloitte, 2022, 89 pages.

Meincheim et al. "Combining process mining with trace clustering", Manufacturing shop floor process—An applied case, Nov. 2017, 9 pages. (Also, Published In: 2017 IEEE 29th International Conference on Tools with Artificial Intelligence (ICTAI) on Jun. 7, 2018).

Omar Sohaib. "Correlating logs and traces—Distributedtracing with Elastic APM in Go part 2", Medium, Jun. 24, 2023, 10 pages.

Wurzenberger et al. "Creating Character-based Templates for Log Data to Enable Security Event Classification", Network Security, Oct. 5-9, 2020, 12 pages.

Zhang et al. "DeepTraLog: Trace-Log Combined Microservice Anomaly Detection through Graph-based Deep Learning", ICSE, May 21-29, 2022, 12 pages.

Opensource, "Analyzing Jaeger trace data", printed from https://opensearch.org/docs/latest/observing-your-data/trace/trace-analytics-jaeger/ on Jan. 8, 2025, 10 pages.

"OpenSearch Dashboards Best Practices", printed from https://docs.logz.io/docs/user-guide/log-management/opensearch-dashboards/opensearch-best-practices/ on Jan. 8, 2025, 9 pages.

* cited by examiner

TRACES:
```
[
 {"trace_id": "1", "span_id": "1.1", "attributes": {"http.method": "GET", "db.system": "myDatabase"}},
 {"trace_id": "2", "span_id": "2.1", "attributes": {"http.method": "POST", "db.system": "myDatabase"}},
 {"trace_id": "3", "span_id": "3.1", "attributes": {"http.method": "GET", "db.system": "anotherDatabase"}},
 {"trace_id": "4", "span_id": "4.1", "attributes": {"http.method": "DELETE", "db.system": "myDatabase"}}
]
```
1300

VECTORS OF TRACES:
1. [1, 1, 0, 1, 0] // GET, myDatabase
2. [1, 0, 1, 1, 0] // POST, myDatabase
3. [1, 1, 0, 0, 1] // GET, anotherDatabase
4. [1, 0, 0, 1, 0] // DELETE, myDatabase

1310

TRACE CATEGORIES WITH LABELS:
```
{
 "categories": [
  {
   "label": "HTTP GET",
   "traces": ["1", "3"]
  },
  {
   "label": "HTTP POST",
   "traces": ["2"]
  },
  {
   "label": "HTTP DELETE",
   "traces": ["4"]
  }
 ]
}
```
1320

FIG. 13

TRACE CLASSIFICATION AND LOG ASSOCIATION FOR DISTRIBUTED SYSTEM TROUBLESHOOTING

BACKGROUND

Embodiments of the invention relate to a troubleshooting system. In particular, embodiments of the invention relate to performing trace classification and log association for distributed system troubleshooting.

A trace may be associated with a log. A trace captures and records information about the execution of a service. A log captures and records information about the operations that the service executes (e.g., retrieve data, add data, store data, etc.).

SUMMARY

In accordance with certain embodiments, a computer-implemented method comprising operations is provided for a troubleshooting system. In such embodiments, selection of a trace is received. The trace is associated with raw log lines. A trace category of the trace is identified, where the trace category is associated with a common log lines template. Common log lines are generated by removing log lines from the raw log lines that do not appear in the common log lines template. One or more relevant trace categories and one or more relevant traces are identified. A problem is identified using the trace, the common log lines, the one or more relevant trace categories, and the one or more relevant traces. A solution for the problem is implemented.

In accordance with other embodiments, a computer program product comprising a computer readable storage medium having program code embodied therewith is provided, where the program code is executable by at least one computer processor to perform operations for a troubleshooting system. In such embodiments, selection of a trace is received. The trace is associated with raw log lines. A trace category of the trace is identified, where the trace category is associated with a common log lines template. Common log lines are generated by removing log lines from the raw log lines that do not appear in the common log lines template. One or more relevant trace categories and one or more relevant traces are identified. A problem is identified using the trace, the common log lines, the one or more relevant trace categories, and the one or more relevant traces. A solution for the problem is implemented.

In accordance with yet other embodiments, a computer system comprises one or more computer processors, one or more computer-readable memories and one or more computer-readable, tangible storage devices; and program instructions, stored on at least one of the one or more computer-readable, tangible storage devices for execution by at least one of the one or more computer processors via at least one of the one or more memories, to perform operations for a troubleshooting system. In such embodiments, selection of a trace is received. The trace is associated with raw log lines. A trace category of the trace is identified, where the trace category is associated with a common log lines template. Common log lines are generated by removing log lines from the raw log lines that do not appear in the common log lines template. One or more relevant trace categories and one or more relevant traces are identified. A problem is identified using the trace, the common log lines, the one or more relevant trace categories, and the one or more relevant traces. A solution for the problem is implemented.

BRIEF DESCRIPTION OF THE DRAWINGS

Referring now to the drawings in which like reference numbers represent corresponding parts throughout:

FIG. 13 illustrates an example of trace categories in accordance with certain embodiments.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
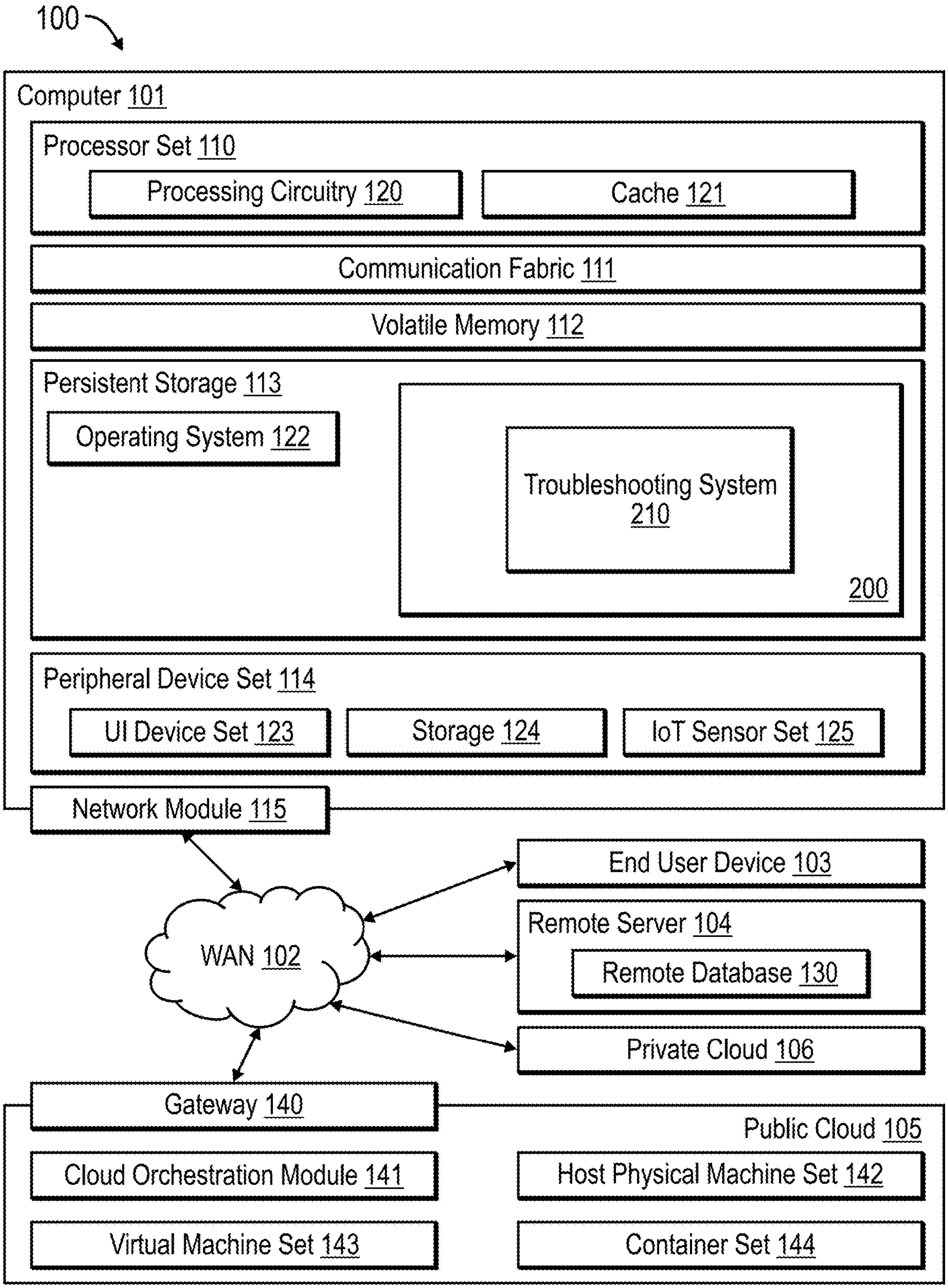
FIG. 1 illustrates a computing environment in accordance with certain embodiments.

Computing environment 100 of FIG. 1 contains an example of an environment for the execution of at least some of the computer code involved in performing the inventive methods, such as a troubleshooting system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set 110 may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (Saas) where software is centrally hosted and allocated on a subscription basis. SaaS is also known as on-demand software, web-based software, or web-hosted software. Four technological sub-fields involved in cloud services are: deployment, integration, on demand, and virtual private networks.

A conventional technique to associate a trace with logs is to define rules that assign log lines to the trace based on context information appearing in the log lines and the trace (e.g., request ID, session ID, transaction ID, or other unique identifier). By leveraging this identifier, it is possible to combine the log lines that share the same identifier for a particular transaction identifier into a single unit. However, this requires developers to add the unique identifier when generating both the traces and the logs. In some case, this may be done by auto-instrumentation at the code level, but, in other cases, this requires manual code changes.

For existing systems in which log lines may not always include unique identifiers and auto-instrumentation or manual code changes are not practically feasible, another conventional technique is to take timestamps as a complementary to the context information, correlate log lines to the trace that are in the same time window. Relying on the timestamp may be insufficient when multiple traces have logs with overlapping time windows. In this case, additional work is performed to distinguish log lines between different traces.

In addition, to search for logs related to a specific trace or the request transaction that generated the trace, logs need to include a trace ID of a trace and a span ID of a span for that trace. However, this requires enriching the logs with the trace ID and the span ID before or during the data collection process and before sending the data for further processing.

Figure 2:
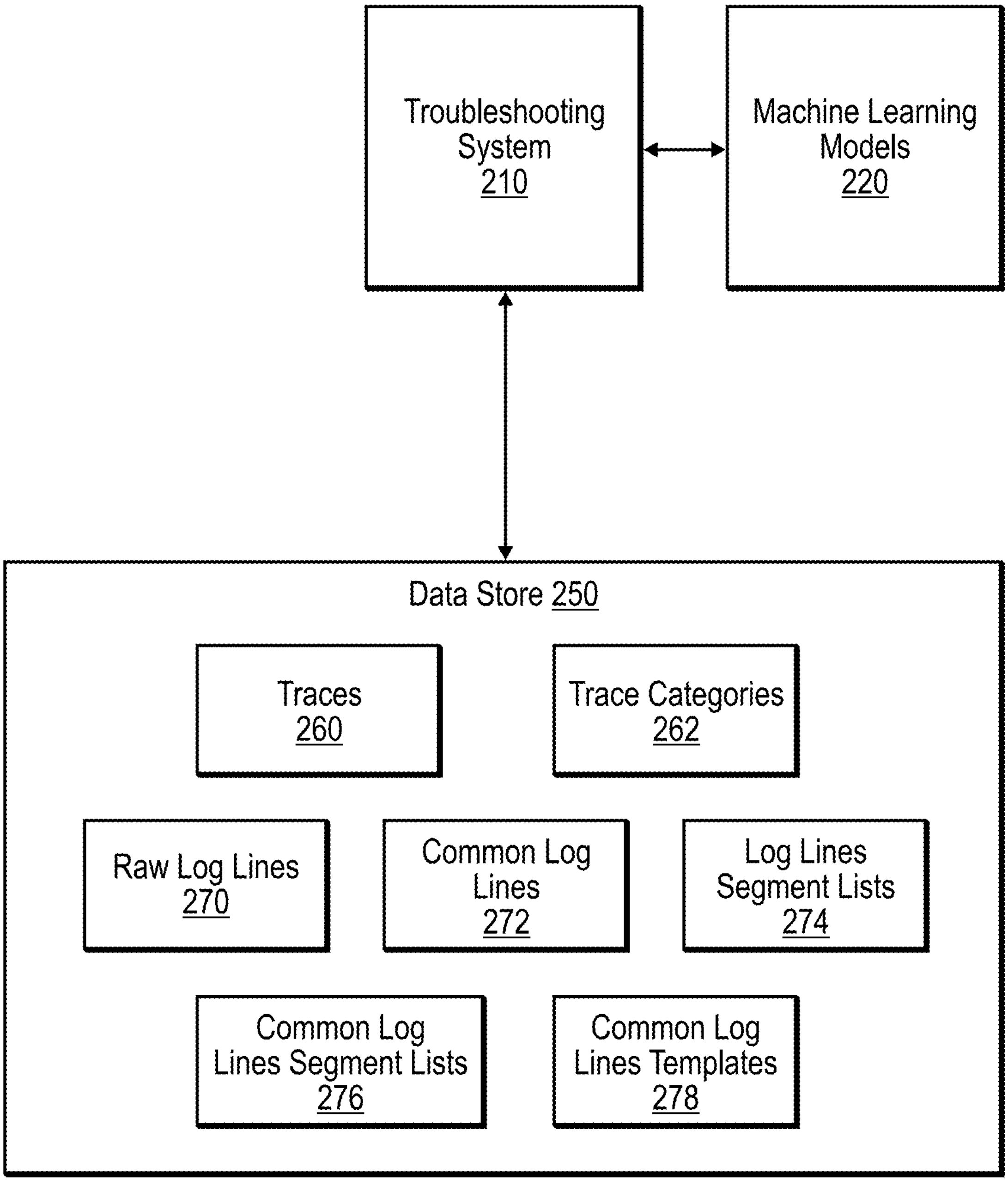
FIG. 2 illustrates a computing environment with a troubleshooting system in accordance with certain embodiments.

FIG. 2 illustrates a computing environment with a troubleshooting system 210 in accordance with certain embodiments. The troubleshooting system 210 may use machine learning models 220. In addition, the troubleshooting system 210 is connected to data store 250.

The data store 250 stores traces 260 and trace categories 262. The troubleshooting system 210 associates each trace 260 with a trace category 262.

In addition, the data store 250 stores raw log lines 270, common log lines 272, log lines segment lists 274, common log lines segment lists 276, and common log lines templates 278. The troubleshooting system 210 removes unrelated log lines from the raw log lines 270 to generate the common log lines 272 for a trace 260. The common log lines 272 of traces 260 in a trace category 262 are associated with the trace category 262 as a log lines segment list 274. The troubleshooting system 210 generates the common log lines segment list 276 from the log lines segment list 274 and generates the common log lines template 278 using the common log lines segment list 276.

Although examples refer to services herein, embodiments apply to functions as well.

Multiple services (or distributed services) are available in a distributed system. A service call may have nested calls to other services, which becomes a call chain. By leveraging tracing technology to explore the trace, the troubleshooting system 210 knows how the call chain looks. This is helpful to troubleshoot system failure by drilling down through the call chain. By exploring the call chain, or trace, the troubleshooting system 210 knows how one service calls to another service, what the input parameters are, and what result is returned.

However, knowing the call chain may not always be sufficient for troubleshooting. For a particular service call, exploring the trace provides the service "boundary", but the trace does not indicate what happens inside the service body. This may be mitigated by exploring the logs associated to each operation in the chain.

For manual debugging of a program bug, it is useful to observe the call stack, the input/output of each call frame, and understand the inside of the service body (i.e., understand each operation performed by the service) to understand how the service works. While manual debug helps drill down further into the service body, it is not always possible, for example, in a custom's environment or a production environment. In that case, logs may be used to understand how the service calls perform. By reviewing the logs for the call chain and for each call, it is possible to get similar insights as manual debug does.

However, the service calls output their logs into a log system sequentially, and the call chain is missing in the log lines.

Thus, the troubleshooting system 210 puts the traces and logs together by associating the traces with the corresponding log lines in a new way so that when a user goes through the trace, in each span, the user sees the corresponding log lines that are related to this span and knows what exactly happened in that span. A span may be referred to as a trace span. In addition, the troubleshooting system 210 identifies relevant (e.g., related) trace categories and traces within those trace categories to provide richer contextual information for troubleshooting system failure.

Figure 3:
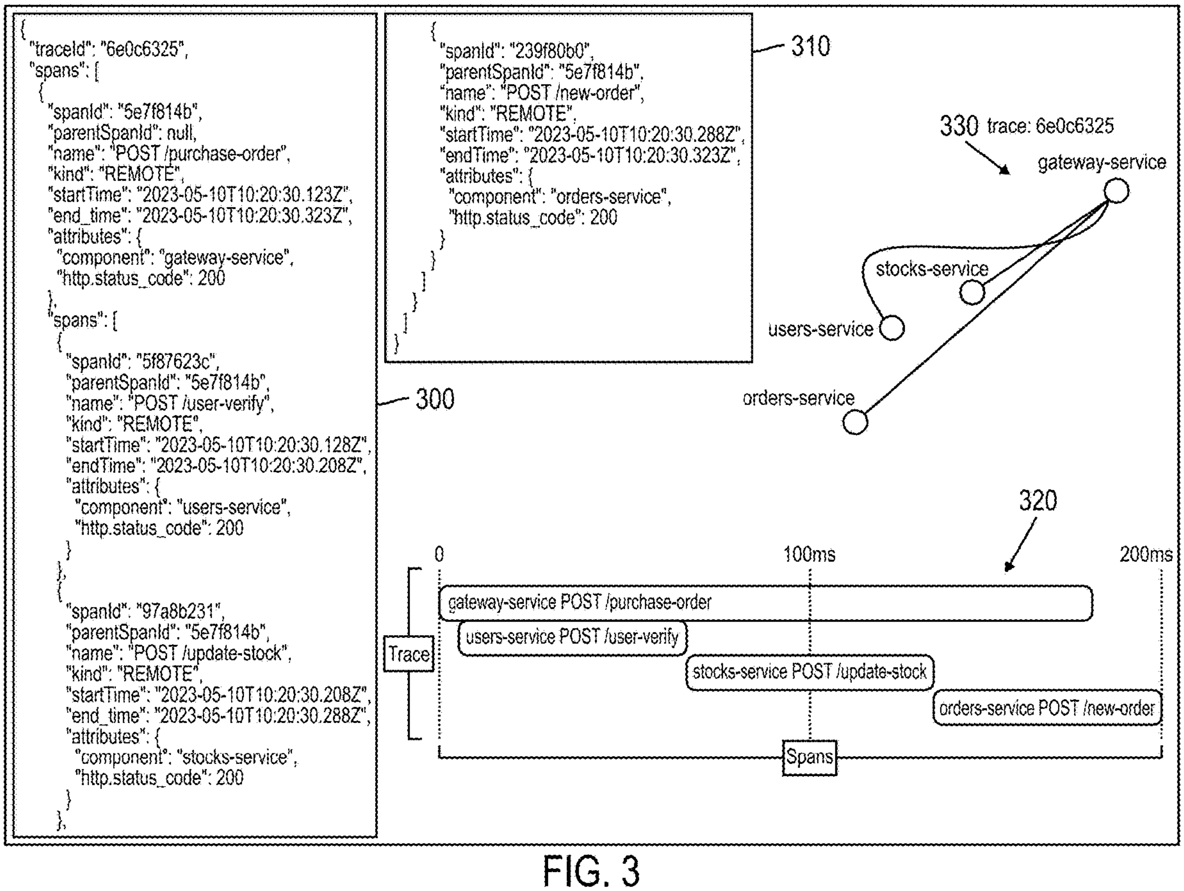
FIG. 3 illustrates example tracing data in accordance with certain embodiments.

FIG. 3 illustrates example tracing data 300,310 in accordance with certain embodiments. The tracing data 300, 310 is captured from a distributed system. A distributed system is a set of services executing on computers/nodes that communicate with each other. The tracing data 300, 310 contains information about the execution flow, timing, and dependencies between microservices. The tracing data 300, 310 is organized in the form of spans, which represent individual units of work within the system. Each span contains specific attributes (e.g., an operation name, start and end timestamps, key-value pairs as contextual information, etc.). Spans are chained to form a trace, which represents the end-to-end flow of a request or transaction. For example, spans are chained to form a trace 320. The trace 320 includes 4 spans. Each span represents either a remote call from one service to another, or a local call within the same service. Also, a trace structure 330 for the trace 320 includes the services gateway-service, users-service, orders-service, and stocks-service, which are in the order in which the services are invoked. The trace structure 330 may also be referred to as a call chain and indicates an order of service calls.

Figure 4:
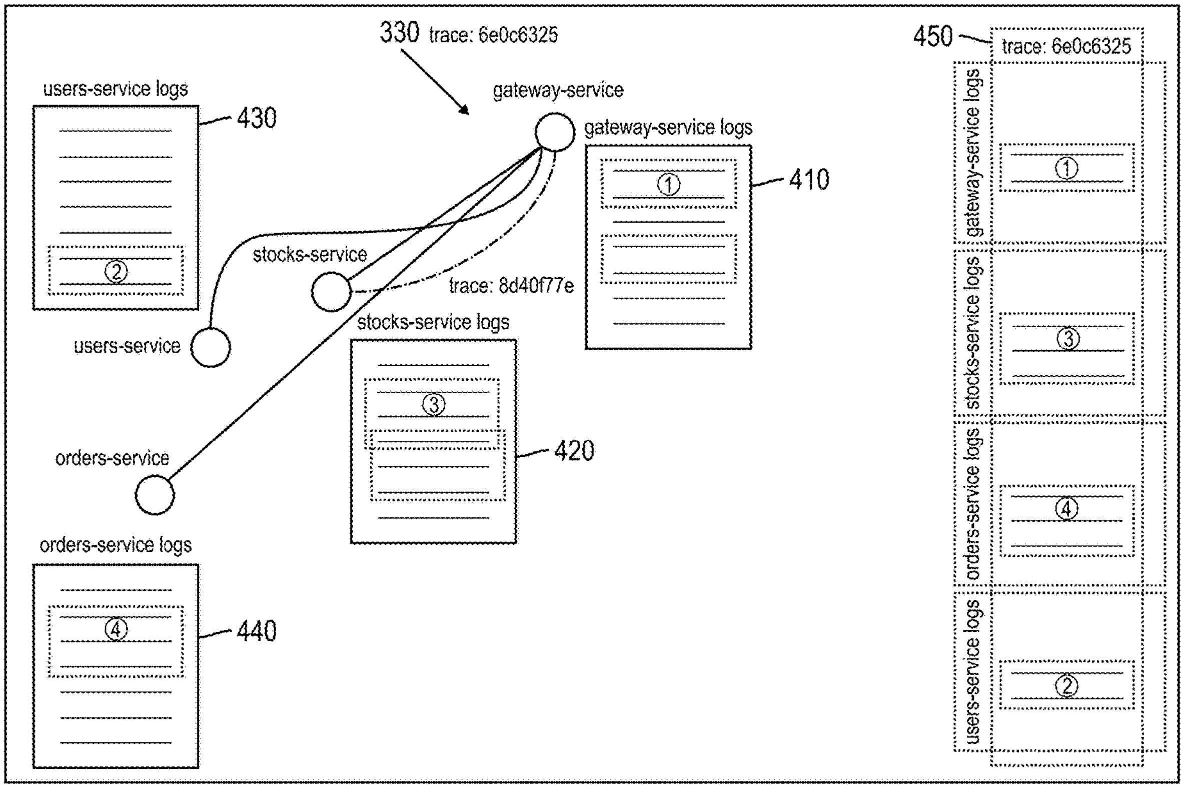
FIG. 4 illustrates an example of associating traces and logs in accordance with certain embodiments.

FIG. 4 illustrates an example of associating traces and logs in accordance with certain embodiments. The execution of a single transaction reflected in a trace often involves multiple services in the distributed system. Throughout the trace, each service generates separate logs that include log lines. The association between the trace and the logs from the microservices arises from the fact that both the trace and the logs capture different aspects of the same transaction. In the example of FIG. 4, the distributed system has four services that generate logs 410, 420, 430, 440, and two traces (trace with ID 6e0c6325 and trace with ID 8d40f77e) are recorded when the distributed system runs. For example, for the trace with ID 6e0c6325, the call chain goes through all four services: gateway-service, users-service, orders-service, and stocks-service. Each service prints a log 410, 420, 430, 440 when the call on the chain comes to that service. Trace and log structure 450 illustrates the logs associated with the services of the trace. Combining the log lines from the services involved in this trace provides a view of all logs from different services that are associated with this trace.

In certain embodiments, the troubleshooting system 210 associates raw log lines to the trace. In particular, the troubleshooting system 210 takes the log lines by the time window determined by the span to establish a raw temporal relationship between the trace and the logs, while considering the log noise because multiple traces may have time windows overlapping with each other.

In certain embodiments, the troubleshooting system 210 groups the traces into categories. In particular, the troubleshooting system 210 finds multiple occurrences of a certain type of trace and groups the occurrences into a single trace category. The troubleshooting system 210 encodes the traces into vectors and calculates the distances between the vectors. Two traces are said to be in a same category when the distance between their vectors is less than a distance threshold.

In certain embodiments, the troubleshooting system 210 extracts common log lines patterns for use in building a common log lines template. In particular, for a certain type of trace, there may be multiple occurrences of this type of trace, but the log lines associated may be different due to different user inputs and runtime contexts. The troubleshooting system 210 links the category to a set of traces, collects the log lines from logs for these traces to build a common log lines template (i.e., by removing those log lines seen in one or a few of the logs), and assigns this common log lines template to the category.

In certain embodiments, each trace category has a representative trace to represent the corresponding trace category. When user selects a trace, the troubleshooting system 210 identifies the category of the trace by encoding the trace into a vector and calculating the distance between this vector and the vector of the trace selected to represent each of the trace categories. In particular, the troubleshooting system 210 finds the trace category for the user selected trace by finding the representative trace that is closest to the user selected trace. In certain embodiments, the troubleshooting system 210 performs a similarity search to calculate the similarity or distance between two vectors.

In certain embodiments, the troubleshooting system 210 encodes each trace into a vector, which also encodes the call chain information (i.e., the trace structure) into the vector. Then, the troubleshooting system 210 detects the similarity (i.e., distance) between the vectors (which also represents similarity between the trace structures or call chains).

Once the trace category is identified, the troubleshooting system 210 identifies the common log lines template associated with the trace category. The troubleshooting system 210 collects the raw log lines for that trace by time window. The troubleshooting system 210 removes noise from the log lines using the common log lines template for that category. The troubleshooting system 210 provides, to the user, the most relevant trace categories and traces by distance relative to a distance threshold.

The troubleshooting system 210 strikes a balance between capturing related log lines within a trace while minimizing the inclusion of unrelated log lines as much as possible, allowing the trace-logs associations to be more accurate.

Figure 5:
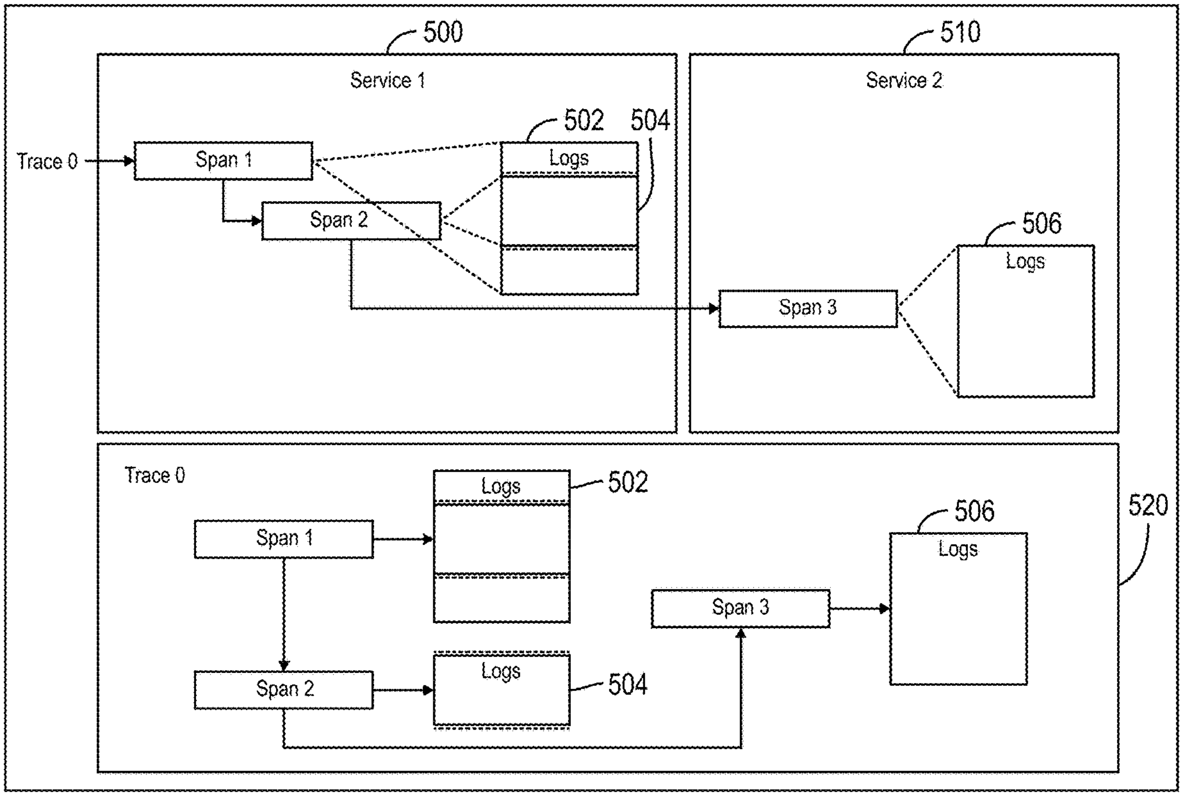
FIG. 5 illustrates a trace across multiple local or distributed services in accordance with certain embodiments.

FIG. 5 illustrates a trace across multiple local or distributed services in accordance with certain embodiments. In FIG. 5, Trace 0 includes multiple calls across multiple local or distributed services. The troubleshooting system 210 associates the span and the corresponding logs for each of these calls. In particular, Trace0 includes Span 1, Span 2, and Span 3, where Span 1 and Span 2 represent the two calls that occurred in Service 1 (box 500), while Span 3 represents a remote call that occurred in Service 2 (box 510). Also, the call represented by Span 1 made the call represented by Span 2, then the call represented by Span 2 made the remote call represented by Span 3. The troubleshooting system 210 associates the appropriate logs with each span. For example, for Span 2, the log lines 504 from the logs 502 are separated out and associated with Span 2 (box 520). Also, Span 1 is associated with logs 502 (which includes log lines 504), while Span 3 is associated with logs 506.

Figure 6:
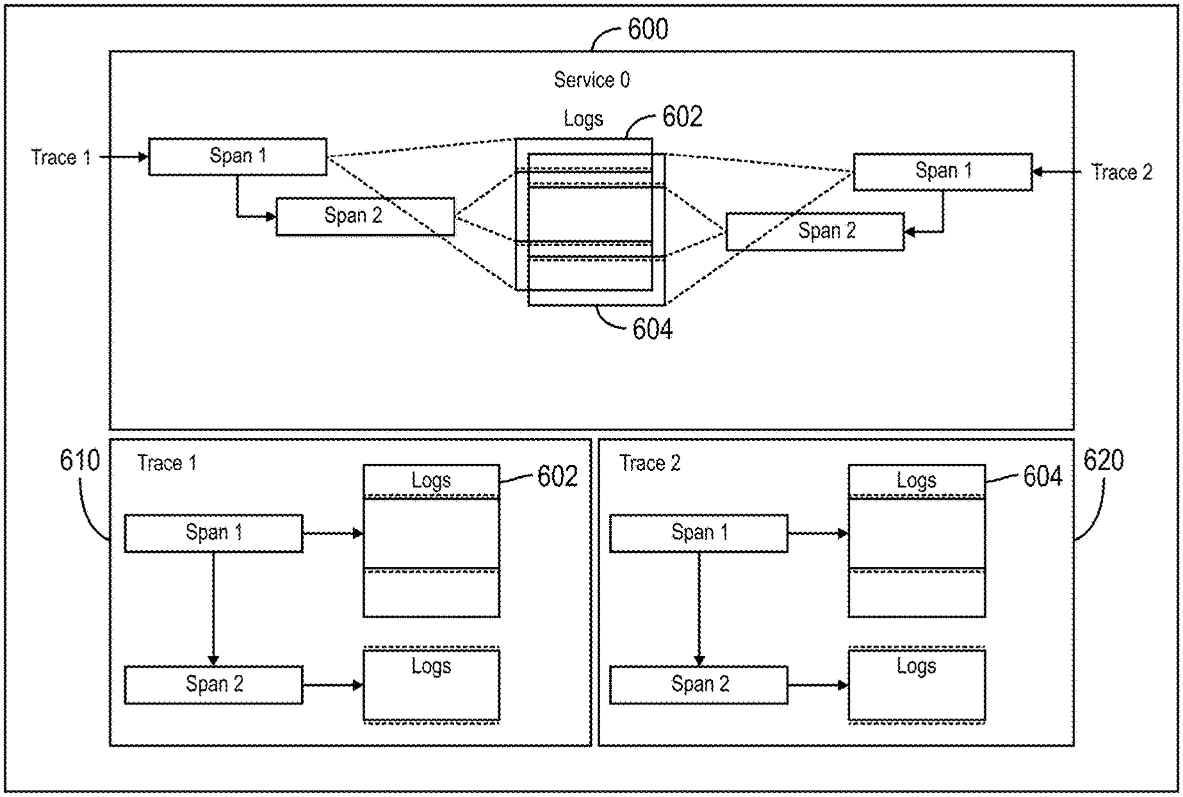
FIG. 6 illustrates similar spans with log lines overlapping in accordance with certain embodiments.

FIG. 6 illustrates similar spans with log lines overlapping in accordance with certain embodiments. As shown in FIG. 6, the spans from multiple traces which happen simultaneously may have their log lines overlap if the logs are sent (i.e., dumped) to the same target (e.g., a log file). The troubleshooting system 210 associates the span and the log lines for each of these spans without having the traces and spans interfere with each other. In FIG. 6, Trace 1 includes Span 1 and Span 2, where Span 1 and Span 2 represent the two calls that occurred in Service 0 (box 600). Trace 2 includes Span 1 and Span 2, where Span 1 and Span 2 represent the two calls that occurred in Service 0 (box 600). The logs 602, 604 for Trace 1 and Trace 2 overlap (box 600). The troubleshooting system 210 associates logs 602 with Trace 1, Span 1 and associates the appropriate log lines of logs 602 with Trace 1 Span 2 (box 610). The troubleshooting system 210 associates logs 604 with Trace 2, Span 1 and associates the appropriate log lines of logs 604 with Trace 2 Span 2 (box 620).

Figure 7:
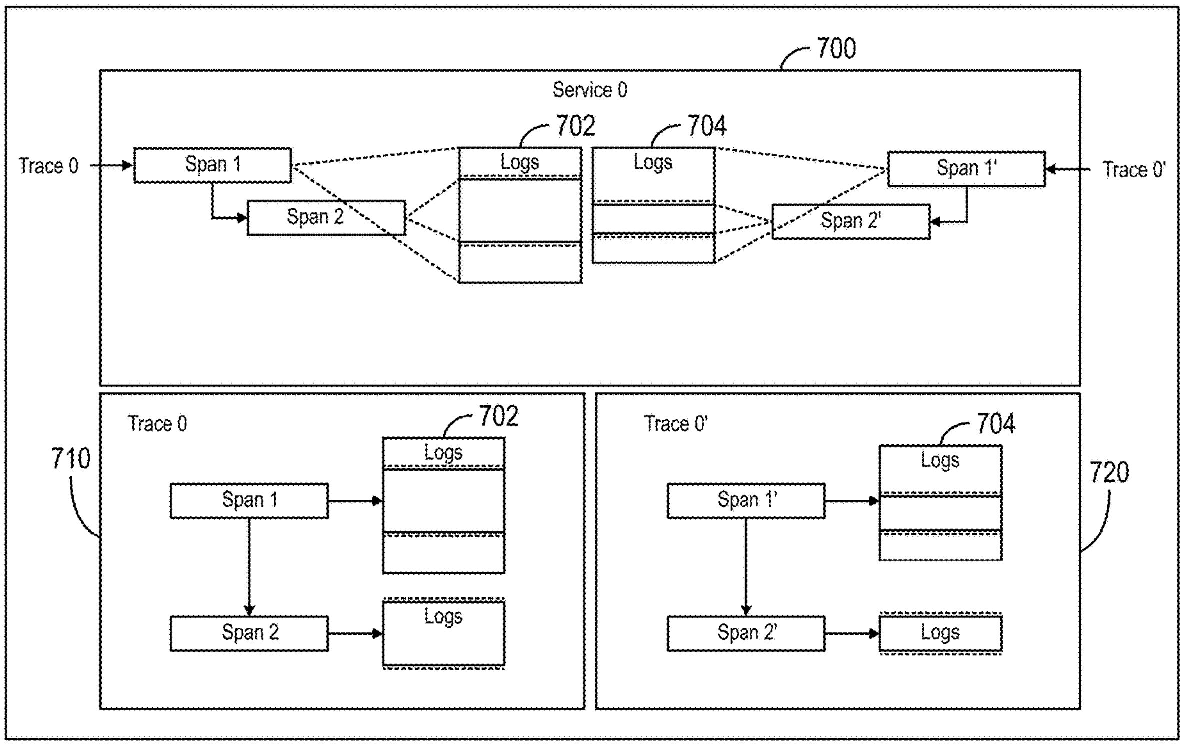
FIG. 7 illustrates two traces that are a same type of trace in accordance with certain embodiments.

FIG. 7 illustrates two traces that are a same type of trace in accordance with certain embodiments. The span for traces that are a same type of trace may have different associated log lines because of different user input or different runtime contexts. Different traces with such variations may be treated as the same type of trace because the trace structure does not change. That is, if the two traces reflect the same call chain, then they have the same trace structure. For example, if one trace has call chain: A calls B, and another trace has call chain: A calls B, then these two traces have the same call chains, hence they have the same trace structures. As another example, if one trace has call chain: A calls B, and another trace has call chain: A calls C, then these two traces have different call chains, hence they have different trace structures.

In FIG. 7, Trace 0 and Trace 0' are a same type of trace (box 700). The troubleshooting system 210 associates logs 702 with Trace 0 Span 1 and associates the appropriate log lines of logs 702 with Trace 0 Span 2 (box 710). The troubleshooting system 210 associates logs 704 with Trace 0' Span 1 and associates the appropriate log lines of logs 704 with Trace 0' Span 2 (box 720).

Figure 8:
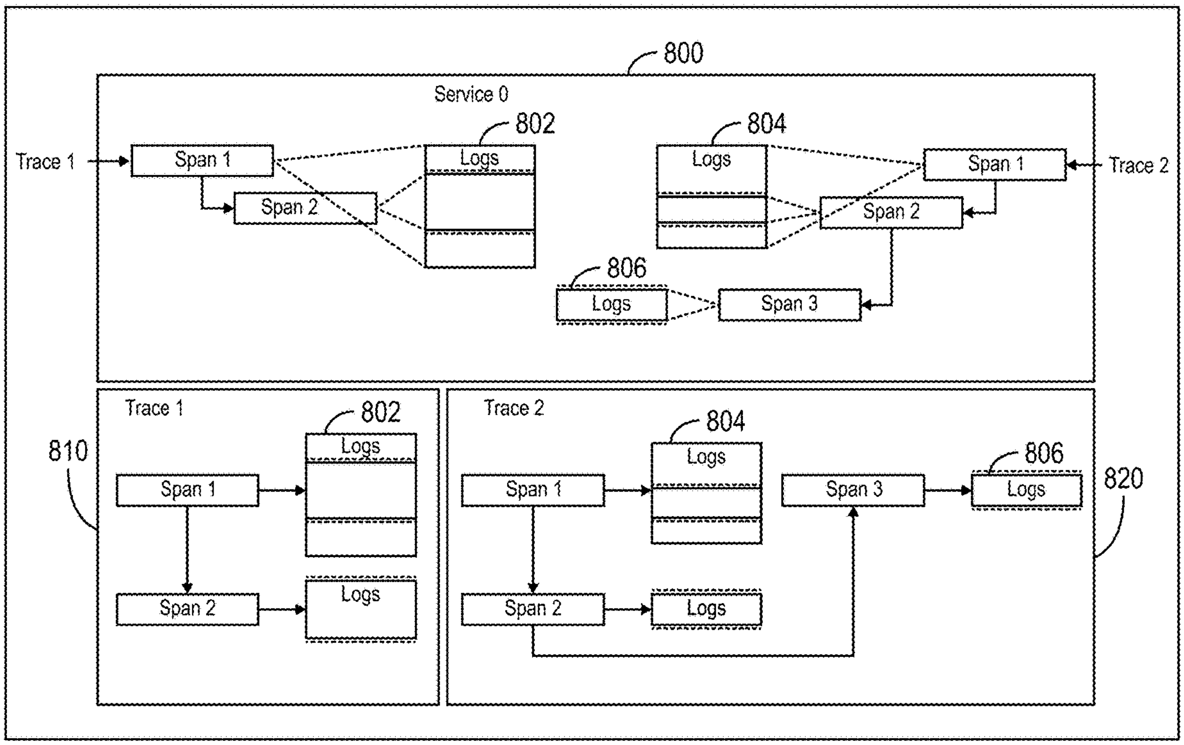
FIG. 8 illustrates traces with different structure in accordance with certain embodiments.

FIG. 8 illustrates traces with different structure in accordance with certain embodiments. The same transaction run may result in different type of traces, given the user input or runtime context differences (e.g., an expected execution path vs. an exceptional execution path). An expected execution path may be a successful execution path. Such traces may have similar, but not exactly the same structure. The troubleshooting system 210 finds these relevant traces and associates them with the log lines. They are treated as different type of traces, but are relevant to each other. The troubleshooting system 210 associates logs 802 with Trace 1 Span 1 and associates the appropriate log lines of logs 802 with Trace 1 Span 2 (box 810). The troubleshooting system 210 associates logs 804 with Trace 2 Span 1 and associates the appropriate log lines of logs 804 with Trace 2 Span 2 (box 820). The troubleshooting system 210 associates logs 806 with Trace 2 Span 3 (box 820).

Figure 9:
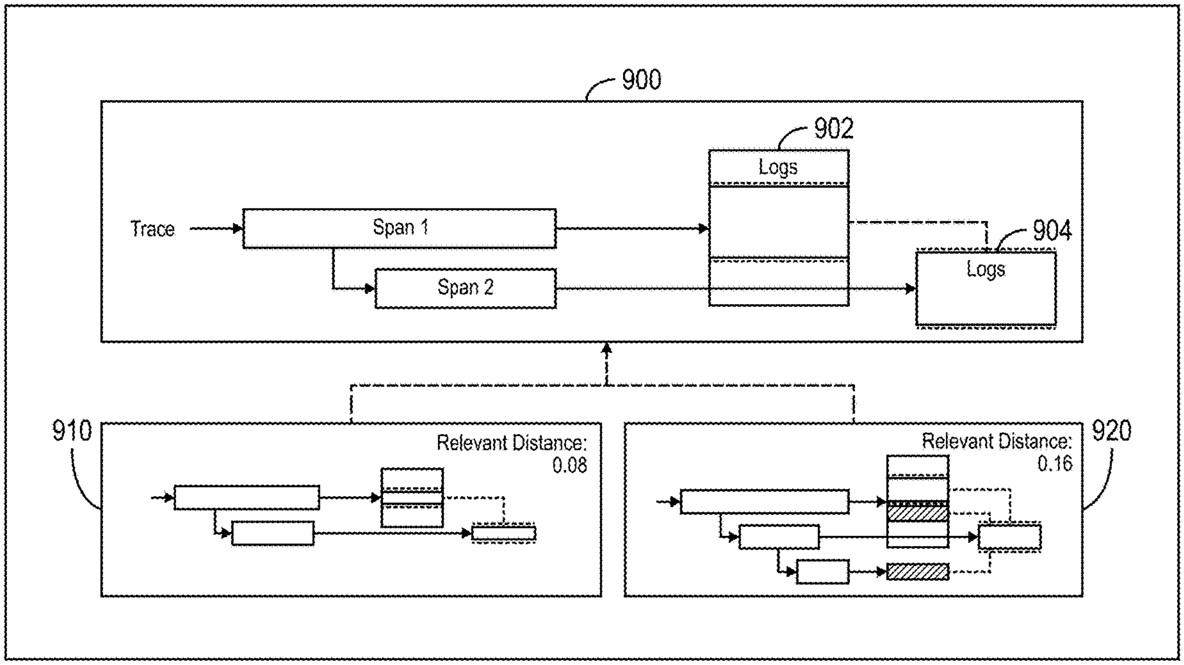
FIG. 9 illustrates a trace tree in accordance with certain embodiments.

FIG. 9 illustrates a trace tree in accordance with certain embodiments. The troubleshooting system 210 builds a tree for a trace that includes a series of spans, and each span has a link to corresponding log lines. A descendant ("child") span may be nested in an ancestor ("parent") span. For a descendant span that is nested in an ancestor span, the descendant span includes the log lines relevant to itself, while the ancestor span includes both the log lines relevant to the descendant span and the log lines relevant to itself to provide complete contextual information. For the log lines associated with each span, the troubleshooting system 210 reduces noise, where noise refers to the log lines unrelated to the span but that are included due to multiple traces having overlaps in the log lines. In FIG. 9, a trace includes Span 1 and Span 2 (box 900). The troubleshooting system 210 finds the most relevant traces to the given trace. In particular, given the trace in box 900, the troubleshooting system 210 found two traces, one in box 910 and the other one in box 920. The trace in box 910 is more relevant to the trace in box 900 than the trace in box 920, because it has a smaller distance value (0.08) than the other one (0.16). Here, the distance is used to measure how "close" (or "similar") two traces are.

Figure 10:
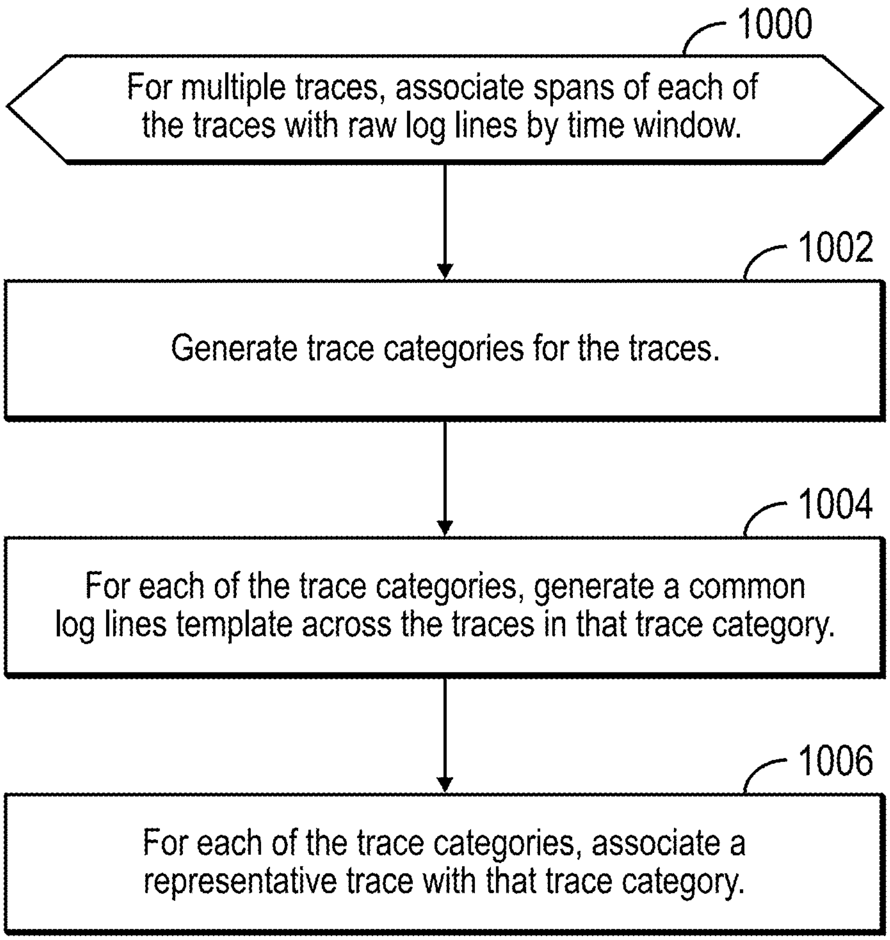
FIG. 10 illustrates, in a flowchart, operations for generating trace categories and common log lines templates for the trace categories in accordance with certain embodiments.

FIG. 10 illustrates, in a flowchart, operations for generating trace categories and common log lines templates for the trace categories in accordance with certain embodiments. Control begins at block 1000 with the troubleshooting system 210, for multiple traces, associating spans of each of the traces with raw log lines by time window. In block 1002, the troubleshooting system 210 generates trace categories for the traces. In certain embodiments, the troubleshooting system 210 generates trace categories for the traces by encoding the traces as vectors and detecting the distance between the vectors. In block 1004, the troubleshooting system 210, for each of the trace categories, generates a common log lines template across the traces in that trace category. In block 1006, the troubleshooting system 210, for each of the trace categories, associates a representative trace with that trace category.

In certain embodiments, the operations of FIG. 10 represent a first phase that occurs before a user selects a trace for troubleshooting. In certain embodiments, the troubleshooting system 210 selects the log lines by the time window determined by each span to establish raw temporal relationships between a trace and logs. The troubleshooting system 210 finds the occurrences for a certain type of trace and puts them into a single trace category by encoding traces into vectors and calculating the distances between vectors. For one trace category, the troubleshooting system 210 locates the traces in that trace category, collects log lines for these traces, builds a common log lines template by dropping those lines seen in a few trace associated log lines, assigns this common log lines template to the trace category. With embodiments, a log line is dropped if it occurs in fewer logs than a drop threshold.

Figure 11:
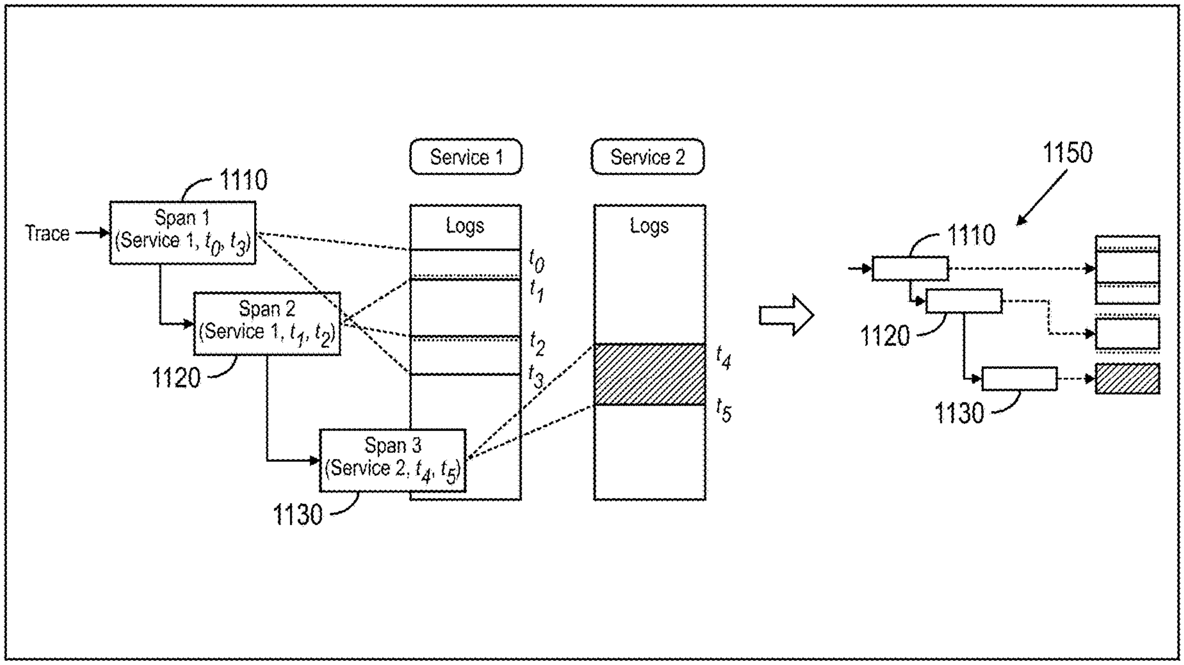
FIG. 11 illustrates associating spans with log lines by time window in accordance with certain embodiments.

FIG. 11 illustrates associating spans with log lines by time window in accordance with certain embodiments. The troubleshooting system 210 locates the raw log lines in the service logs and associates them to the corresponding span for the traces collected from a system. For example, the troubleshooting system 210 has associated log lines for spans 1110, 1120, 1130 in structure 1150.

Given a trace and its spans, by checking contextual information, the troubleshooting system 210 determines, for each span, when and where the span occurs (e.g., a span occurs from t0 to t3 at Service 1). With this information, the troubleshooting system 210 knows where to locate the corresponding log lines in a specific time window, and the troubleshooting system 210 extracts the log lines and associates the log lines to the span.

As a service in a distributed system usually processes multiple requests simultaneously, not all log lines in the same time window may belong to the same span. Thus, the troubleshooting system 210 removes the noise (i.e., log lines that don't belong to the span).

Figure 12:
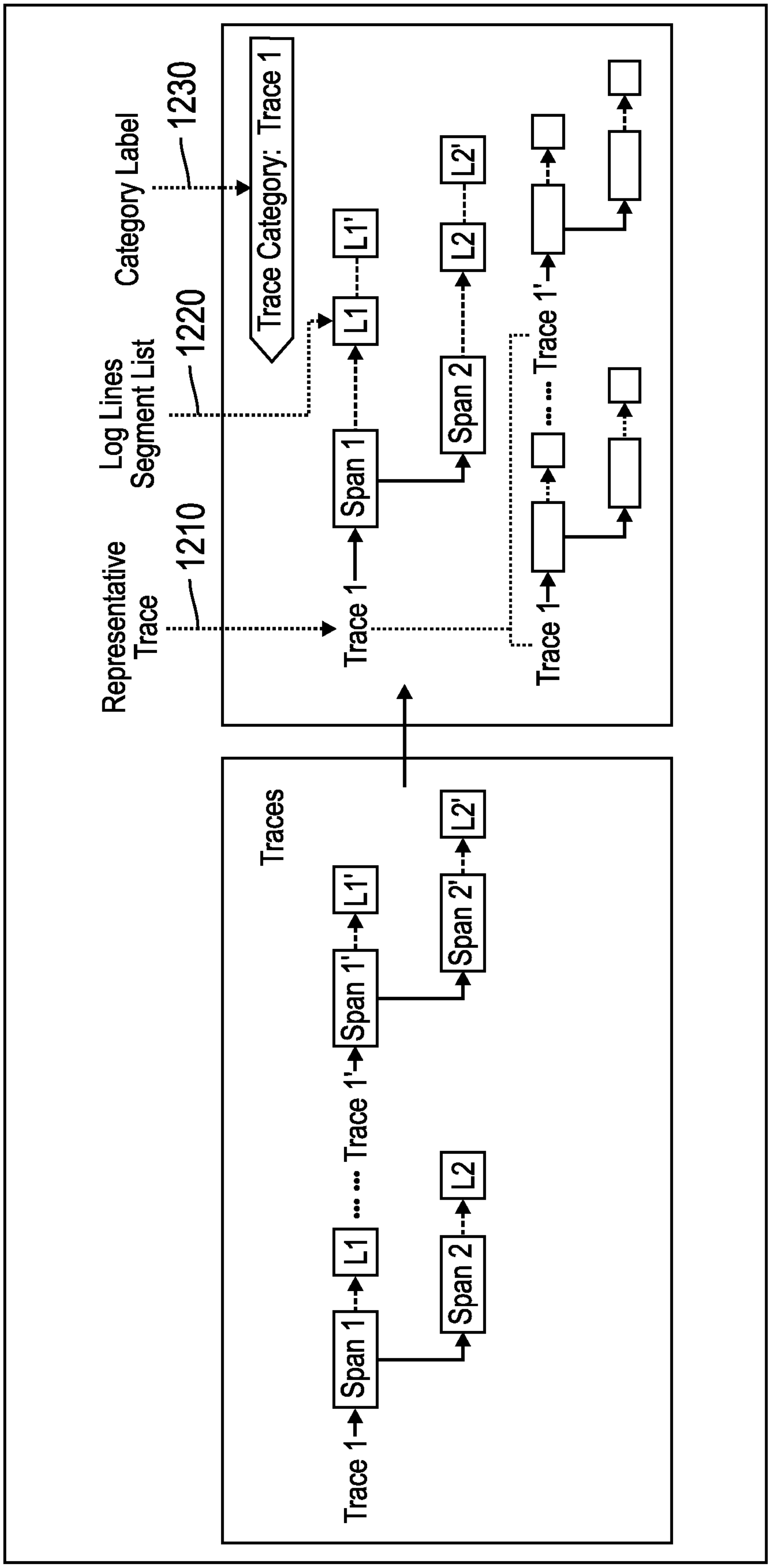
FIG. 12 illustrates generating trace categories for traces in accordance with certain embodiments.

FIG. 12 illustrates generating trace categories for traces in accordance with certain embodiments. The troubleshooting system 210 determines the trace categories among the traces collected from the system and marks relevancy between traces by checking relevant distances among the traces. In certain embodiments, the troubleshooting system 210 encodes each trace of multiple traces into a vector. Then, the troubleshooting system 210 determines which of the traces are close in distance (i.e., similarity), and the traces that are close are put into one trace category. For example, if the distance between Vector 1 (for Trace 1) and Vector 2 (for Trace 2) is 0.01, while the distance between Vector 1 (for Trace 1) and Vector 3 (for Trace 3) is 0.91, then the troubleshooting system 210 determines that Vector 1 and Vector 2 are closer (more relevant to each other) than Vector 1 and Vector 3. That is, the troubleshooting system 210 determines that Vector 1 and Vector 2 more likely belong to the same trace category, because they are much closer, while Vector 3 belons to a different trace category as it is further away from Vector 1 and Vector 2. With these three vectors, the troubleshooting system 210 identifies two trace categories, where Vector 1 and Vector 2 belong to one category, and Vector 3 belongs to another category. Multiple traces having similar spans and organized in a same structure are treated as belonging to one trace category. The troubleshooting system 210 groups these traces in the same trace category and re-associates the corresponding log lines for these traces to the category as a Log lines segment sist. In certain embodiments, the troubleshooting system 210 determines the category by encoding each trace and saving the encoding of the trace as vector. Then, the troubleshooting system 210 calculates the distance between these vectors of the traces. If the distance of vectors is 0 or very close to 0, then the troubleshooting system 210 places the traces into the same trace category.

In certain embodiments, the troubleshooting system 210 provides a reference implementation. In certain embodiments, the troubleshooting system 210 encodes traces using Graph Neural Networks (GNNs) to encode traces into fixed-size vector embeddings, preserving both span information and relationships. A GNN is a type of machine learning model 220. Then, the troubleshooting system 210 applies Principal Component Analysis (PCA) to reduce dimensions and make the vectors more manageable. PCA is a type of machine learning model 220. The troubleshooting system 210 performs a similarity search using an AI similarity search for efficient approximate nearest neighbor searches. The troubleshooting system 210 performs clustering by applying efficient clustering techniques (e.g., Mini-Batch K-Means, etc.) to categorize the traces.

Once the trace categories are determined, the troubleshooting system 210 assigns a category label to each trace to identify the corresponding trace category. The troubleshooting system 210 selects a representative trace to be an actual trace closest to the centroid, to represent the trace category. The troubleshooting system 210 associates the log lines for the traces in this category are associated to the representative trace as a Log lines segment list.

For example, in FIG. 12, there is a representative trace 1210, a log lines segment list 1220, and a category label 1230. This trace category includes traces: Trace 1 and Trace 1'.

FIG. 13 illustrates an example of trace categories in accordance with certain embodiments. A category label is a label used to uniquely identify a category. The category label is a metadata to a trace category. In FIG. 13, traces 1300 are converted to vectors 1310, which indicate that two traces are "GET", one trace is "POST", and one trace is "DELETE". This results in the three trace categories 1320.

Figure 14:
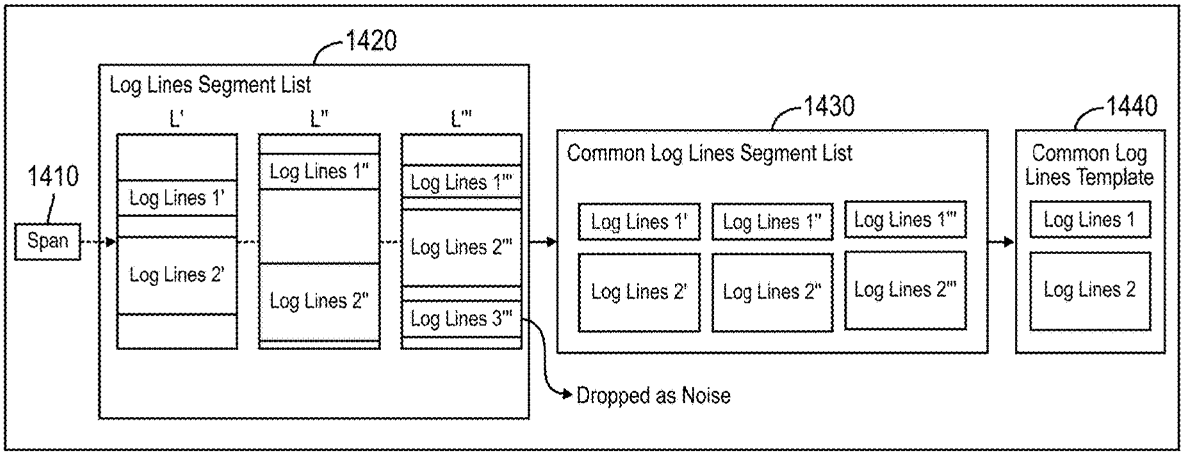
FIG. 14 illustrates finding common log lines in accordance with certain embodiments.

FIG. 14 illustrates finding common log lines in accordance with certain embodiments. The troubleshooting system 210 finds common log lines from raw log lines associated with the span for a trace. Initially, the troubleshooting system 210 associates a log lines segment list for each span in a trace category. If the troubleshooting system 210 identifies a particular log line in all or most of the log lines segments in the log lines segment list, then the troubleshooting system 210 designates (i.e., marks) the particular log line as a common log line, otherwise, the troubleshooting system 210 designates the particular log line as noise that may be dropped. The more traces from the same category and the corresponding log lines that are collected, the more accurate the troubleshooting system 210 is in identifying the common log lines.

There are many ways to find the common log lines for a span in a trace category. In certain embodiments, the troubleshooting system 210 encodes the log lines as vectors, and, for one selected log line, calculates the distance between this log line and the log lines in other segments based on the distance between the vectors of the log lines. If the distance is 0 or very close to 0, the troubleshooting system 210 determines that this selected log line, along with its peers in other segments in the list, belong to common log lines. In some embodiments, the troubleshooting system 210 does not find common log lines and determines that this selected log line is most likely noise and should be dropped.

In certain embodiments, common log lines are the log lines appearing in all or most log lines segments. They are very similar, but with variations because of the user input or runtime context difference. Once the common log lines are identified, the troubleshooting system 210 generates a common log lines segment list.

The troubleshooting system 210 creates a common log lines template based on the common log lines segment list. The troubleshooting system 210 keeps the text appearing in the log lines in all segments and replaces the variations using placeholders. In a later phase, the troubleshooting system 210 uses the common log lines template to determine whether the log lines belong to the common log lines template, and, hence belong to the corresponding trace span. In certain embodiments, for two different sets of log lines: 1) User1 placed an order at 10:00 AM; 2) User2 placed an order at 10:12 AM. Then the variation is the user ID (User1/User2) and the time (10:00 AM/10:12 AM). The troubleshooting system 210 keeps the same contents and replaces the variations with placeholders. So, in this particular case, the result will be: {1} placed an order at {2}, where {1} maps to user ID and {2} maps to time.

In FIG. 14, for a span 1410, there is a log lines segment list 1420 for L', L", and L'". From the log lines segment list 1420, the troubleshooting system 210 generates the common log lines segment list 1430. The troubleshooting system 210 may use the common log lines segment list 1430 to generate a common log lines template 1440.

Figure 15:
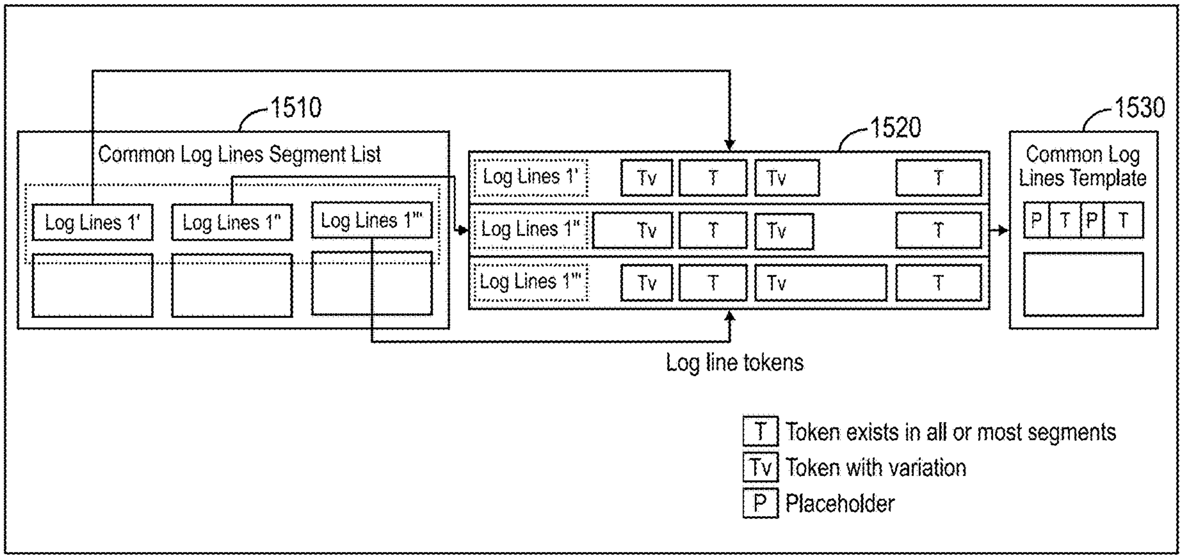
FIG. 15 illustrates generating common log lines templates in accordance with certain embodiments.

FIG. 15 illustrates generating common log lines templates in accordance with certain embodiments. There are different ways to generate the common log lines template for a span based on the common log lines segment list. In certain embodiments, the troubleshooting system 210 tokenizes the log lines in the common log lines segment list. Then, for each token, the troubleshooting system 210 checks whether that token exists in all or most segments. If yes, the troubleshooting system 210 accepts the token as part of the common log lines template, otherwise, the troubleshooting system 210 replaces the token by a placeholder before putting the token into the common log lines template. That is, for each of the tokens that occurs in a number of the common log lines segment lists that is less than a token threshold, the troubleshooting system 210 replaces that token with a placeholder. In particular, the troubleshooting system 210 transforms the log lines in the common log lines segment list to a series of tokens concatenated with placeholders and stored into the common log lines template.

In FIG. 15, the common log lines segment list 1510 has log lines 1', log lines 1", and log lines 1". The troubleshooting system 210 transforms these into the tokens 1520. Then, the troubleshooting system 210 uses the tokens to create the common log lines template 1530.

Figure 16:
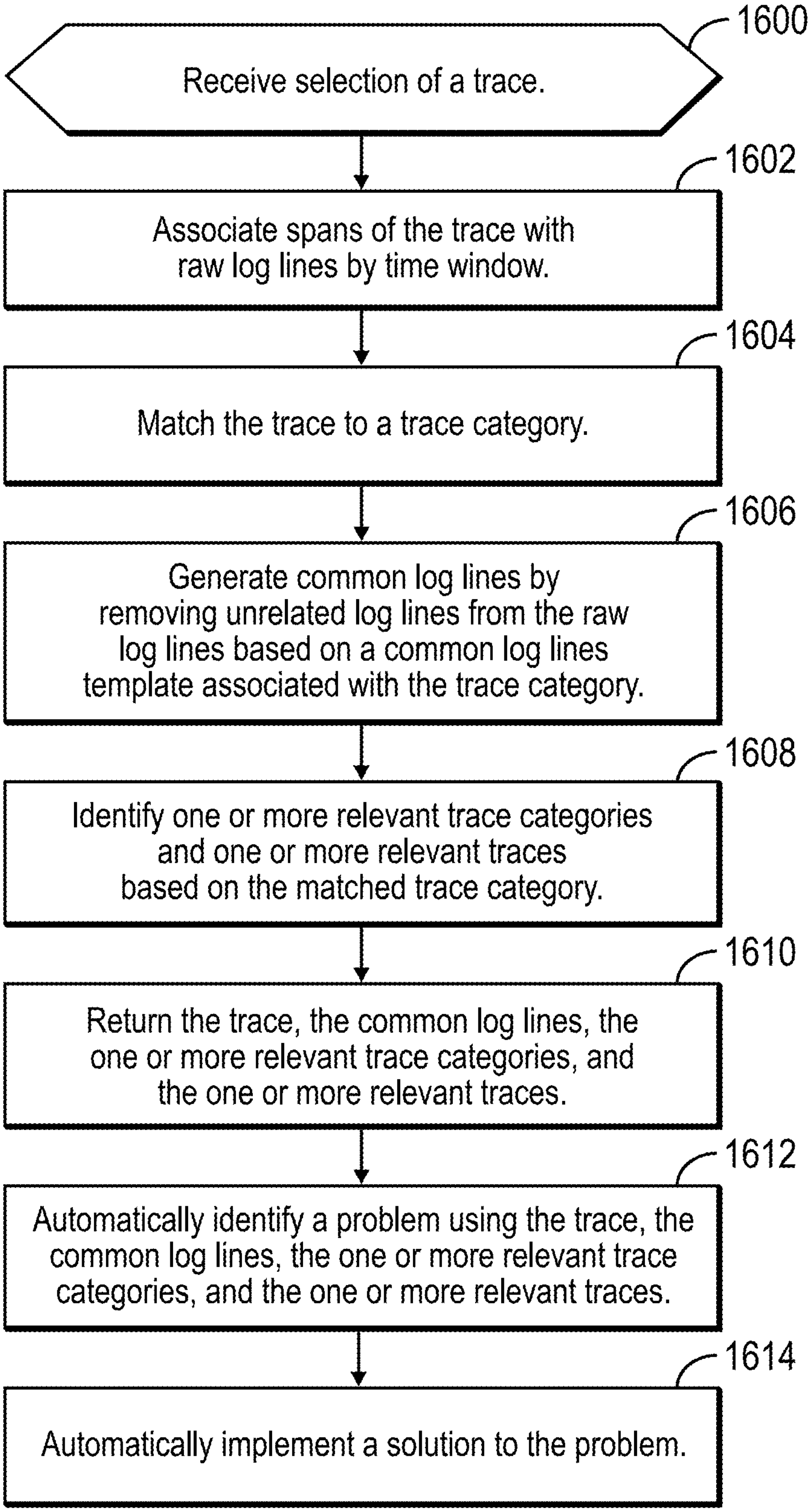
FIG. 16 illustrates, in a flowchart, operations for matching a particular trace to a trace category and updating log lines based on a common log lines template in accordance with certain embodiments.

FIG. 16 illustrates, in a flowchart, operations for matching a particular trace to a trace category and updating log lines based on a common log lines template in accordance with certain embodiments. Control begins at block 1600 with the troubleshooting system 210 receiving selection (e.g., from a user) of a trace.

In block 1602, the troubleshooting system 210 associates spans of the trace with raw log lines by time window. In certain embodiments, the processing of block 1602 to associate the spans is the same as described with reference to block 1000 (FIG. 10), except that, instead of processing many traces in a batch (as is done in block 1000), the troubleshooting system 210 processes the one selected trace.

In block 1604, the troubleshooting system 210 matches the trace to a trace category.

In block 1606, the troubleshooting system 210 generates common log lines by removing unrelated log lines from the raw log lines based on a common log lines template associated with the trace category. In certain embodiments, since the troubleshooting system 210 identified the trace category for the selected trace, the troubleshooting system 210 obtains the common log lines template for each span in this trace category. Then, the troubleshooting system 210 iterates through the raw log lines to attempt to find matches in the common log lines template. The troubleshooting system 210 removes those log lines that are not found in the common log lines template. That is the log lines that are considered noise are removed.

In block 1608, the troubleshooting system 210 identifies one or more relevant trace categories and one or more relevant traces based on the matched trace category. The one or more relevant trace categories and the one or more relevant traces provide context for the selected trace.

In block 1610, the troubleshooting system 210 returns the trace, the common log lines, the one or more relevant trace categories, and the one or more relevant traces. In certain embodiments, the troubleshooting system 210 returns these to a user by displaying them via a user interface on a computer screen.

In block 1612, the troubleshooting system 210 automatically identifies a problem using the trace, the common log lines, and the relevant trace categories and traces. In block 1614, the troubleshooting system 210 automatically implements (i.e., applies) a fix. In certain embodiments, the troubleshooting system 210 performs the operations of blocks 1612 and 1614 directly. In other embodiments, the troubleshooting system 210 invokes a tool (e.g., a debugging/repair tool or an issue detection/repair tool) to perform the operations of blocks 1612 and 1614.

In certain embodiments, the operations of FIG. 16 represent a second phase that occurs after a user selects a trace for troubleshooting. The troubleshooting system 210 finds the trace category of a trace by encoding the user-selected trace into a vector and calculating the distance to vectors of traces in trace categories. The troubleshooting system 210 collects the raw log lines for the user-selected trace by trace span time window. The troubleshooting system 210 removes noise from the log lines by matching the log lines to the common log lines template for that category. The troubleshooting system 210 shows the most relevant trace categories and traces based on distance calculation.

In certain embodiments, a user selects a trace (e.g., a trace for a problem), and the troubleshooting system 210 finds and lists the most relevant trace categories and traces within those trace categories. In addition, the troubleshooting system 210 displays the log lines associated to the selected trace for each span with noise removed.

Figure 17:
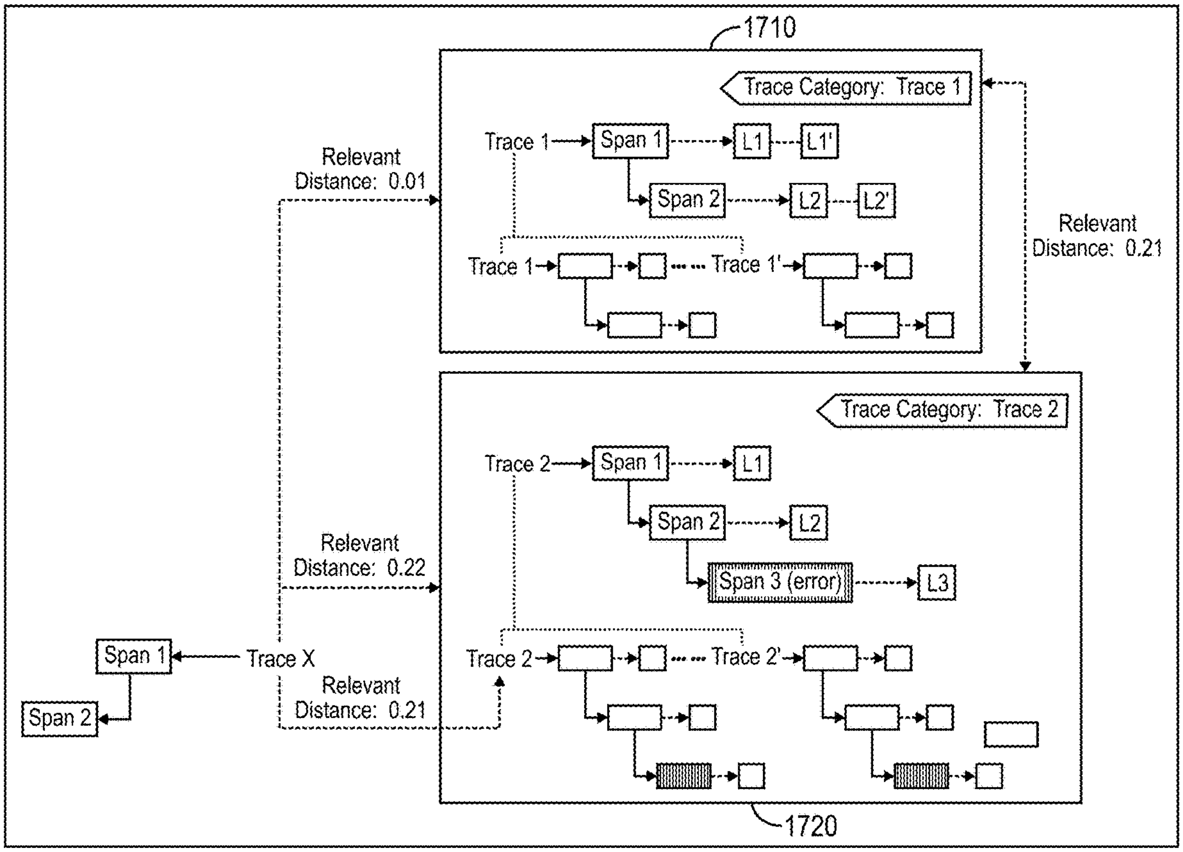
FIG. 17 illustrates determination of relevant trace categories and traces in those trace categories in accordance with certain embodiments.

In certain embodiments, the troubleshooting system 210, given a trace, finds the trace category that the trace belongs to then finds relevant trace categories and traces. FIG. 17 illustrates determination of relevant trace categories and traces in those trace categories in accordance with certain embodiments. In certain embodiments, the troubleshooting system 210 troubleshooting system 210 uses distance to measure how relevant one trace category is to another trace category and how relevant one trace is to another trace, even if they belong to different trace categories.

The same service run may result in different execution paths, which result in different raw log lines, due to different user input or runtime context (e.g., an expected execution path vs. an exceptional execution path). The troubleshooting system 210 calculates the distance between traces to determine how these execution paths are related. Once the troubleshooting system 210 determines that a particular trace belongs to a particular trace category, the troubleshooting system 210 also identifies relevant trace categories and traces to the particular trace. For example, when debugging a trace showing an error, the troubleshooting system 210 enables comparing that trace with relevant traces showing an expected (i.e., successful) execution path to help with understanding what an expected result looks like, which is helpful for debugging code.

For example, for a function with a branch where $x>1$ performs first instructions, while $x<=$to 1 performs second instructions, given different input values for argument x, different instructions are performed, which results in different raw log lines. For example, if $x=10$, the log includes a log line such as: "x is larger than 1."; while if $x=0$, the log includes a log line such as: "x is less than or equal to 1."

In certain embodiments, the troubleshooting system 210 identifies one or more relevant traces for a selected trace. The troubleshooting system 210 finds the trace category where the selected trace belongs based on calculating the distances between the vector of the selected trace and vectors of a representative trace of trace categories. Once the trace category is identified, the troubleshooting system 210 finds and lists the one or more relevant traces from that trace category based on the distances. In particular, if the distance between the vector of the selected trace and the vector of another trace in the identified trace category is less than a distance threshold, then that other trace is determined to be a relevant trace. In certain embodiments, the troubleshooting system 210 provides the top pre-determined number of traces.

The troubleshooting system 210 also identifies one or more trace categories for a selected trace based on calculating the distances between the vector of the selected trace and vectors of the representative trace of the trace categories. In certain embodiments, the troubleshooting system 210 provides the top pre-determined number of trace categories.

In FIG. 17, the troubleshooting system 210 determines that Trace X is in Trace Category: Trace 1, determines that Trace 1 with a relevant distance of 0.01 is the most relevant trace in Trace Category: Trace 1, determines that Trace Category: Trace 2 is the most relevant trace category that is relevant with reference to in Trace Category: Trace 1 with a relevant distance of 0.21, and finds that Trace 2 with a relevant distance of 0.21 is the most relevant trace in the Trace Category: Trace 2.

FIG. 17 illustrates determination of relevant trace categories and traces and of log lines in those trace categories in accordance with additional embodiments.

Figure 18:
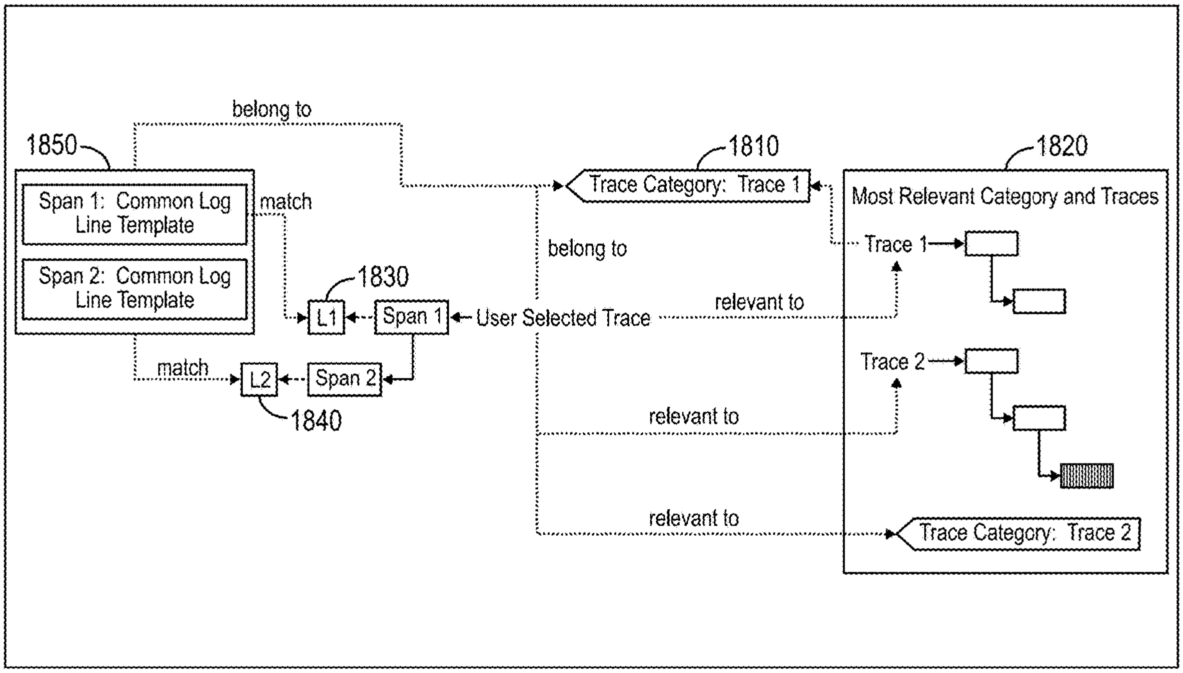
FIG. 18 illustrates determination of relevant trace categories and traces and of log lines in those trace categories in accordance with additional embodiments.

In FIG. 18, the troubleshooting system 210 identifies and outputs a trace category 1810, relevant categories and traces 1820, and log lines 1830, 1840 that are adjusted based on common log lines templates 1850.

Figure 19:
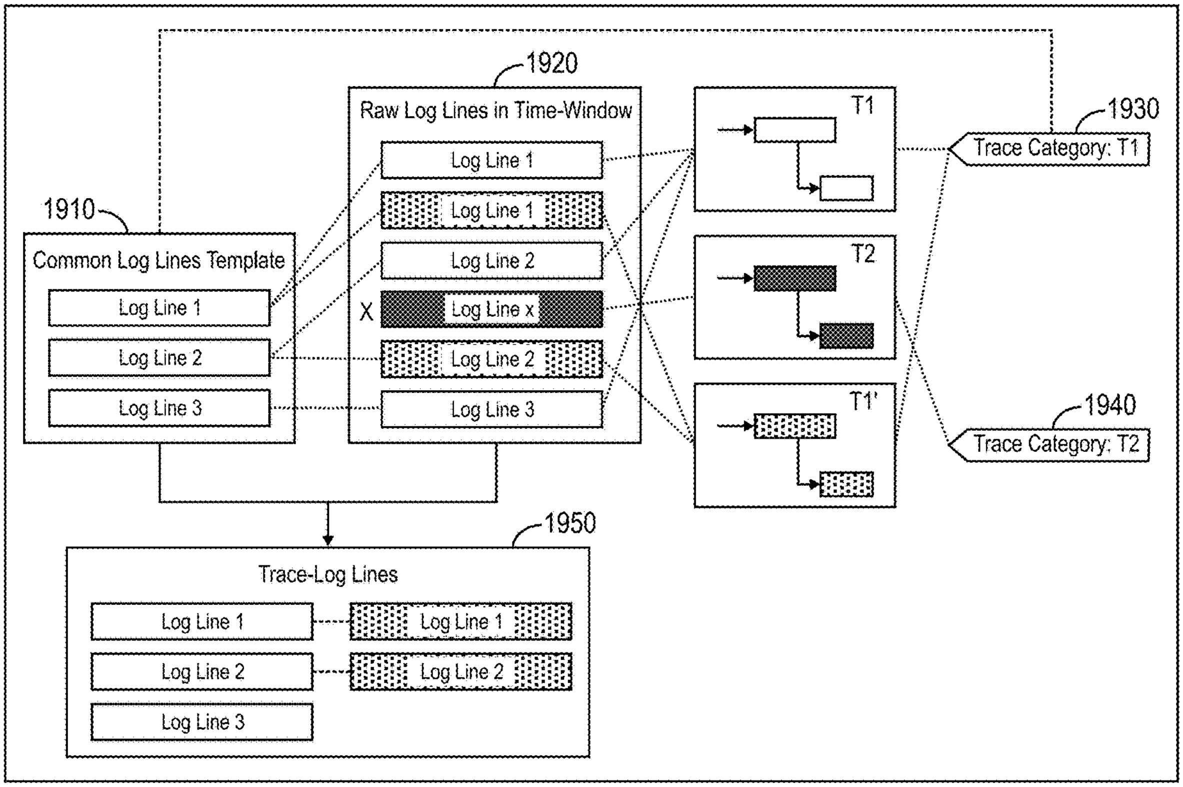
FIG. 19 illustrates determination of output in accordance with certain embodiments.

FIG. 19 illustrates determination of output in accordance with certain embodiments. In FIG. 19, the common log lines template 1910 belongs to the trace category T1 1930. Given a time window, the raw log lines 1920 include log line x from trace T2 belonging to Trace Category T2 1940, which is removed from the raw log lines 1920 as it is not found in the common log lines template 1910. Log line 1 and 2 from trace T1 and T1' belonging to Trace Category T1 1930 remain in the raw log lines 1920 since they are found in the common log lines template. Then, the updated raw log lines 1920 are output (e.g., to a computer screen) as the trace log lines.

Figure 20:
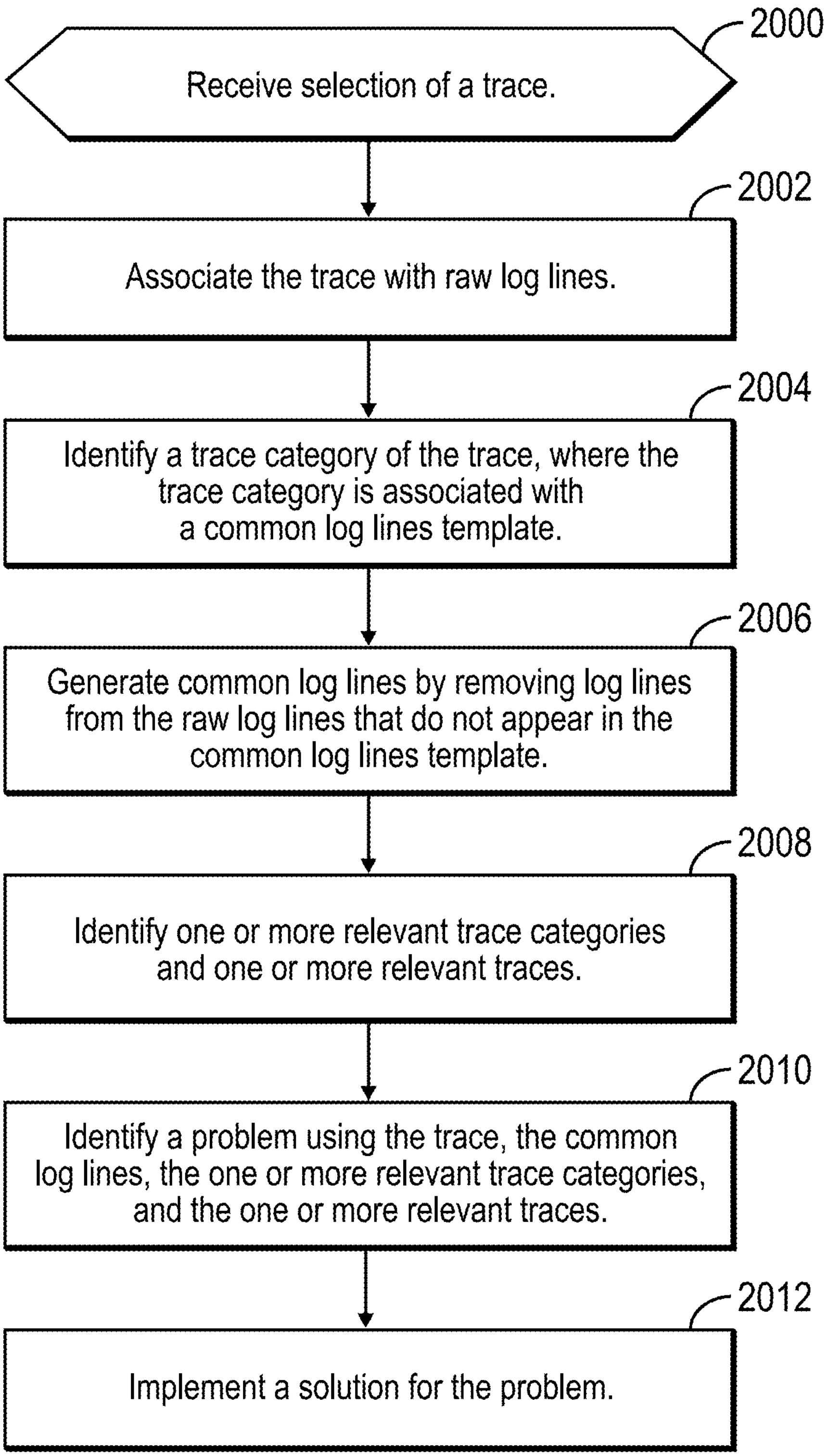
FIG. 20 illustrates, in a flowchart, operations for troubleshooting a problem and applying a solution in accordance with certain embodiments.

FIG. 20 illustrates, in a flowchart, operations for troubleshooting a problem and applying a solution in accordance with certain embodiments. Control begins at block 2000 with the troubleshooting system 210 receiving selection of a trace. In block 2002, the troubleshooting system 210 associates the trace with raw log lines. IN block 2004, the troubleshooting system 210 identifies a trace category of the trace, where the trace category is associated with a common log lines template. In block 2006, the troubleshooting system 210 generates common log lines by removing log lines from the raw log lines that do not appear in the common log lines template. In block 2008, the troubleshooting system 210 identifies one or more relevant trace categories and one or more relevant traces. In block 2010, the troubleshooting system 210 identifies a problem using the trace, the common log lines, the one or more relevant trace categories, and the one or more relevant traces. In block 2012, the troubleshooting system 210 implements a solution for the problem.

In certain embodiments, the troubleshooting system 210 associates traces with log lines automatically to provide a full view of a request call chain for a system user. The troubleshooting system 210 provides the full call chain view with minimized noise log lines and without code changes (i.e., without adding identifiers when generating the traces and the logs) to an existing system.

In certain embodiments, embodiments may be used in monitoring a system with request trace and method trace (e.g., in a cloud environment).

Thus, in certain embodiments, the troubleshooting system 210 groups traces into categories by encoding traces into vectors and calculating the distances between the vectors. Then for a given trace, the troubleshooting system 210 finds the most relevant categories and traces based on the distance calculation.

The troubleshooting system 210 builds common log lines templates for each trace category by collecting the log lines for all traces that belong to the category and then removing those lines seen in some trace associated log lines in the category as noise.

For a given trace, the troubleshooting system 210 collects the log lines by time window, removes noise from the log lines by resolving the category that the trace belongs to and then using the common log lines template for that category.

Figure 21:
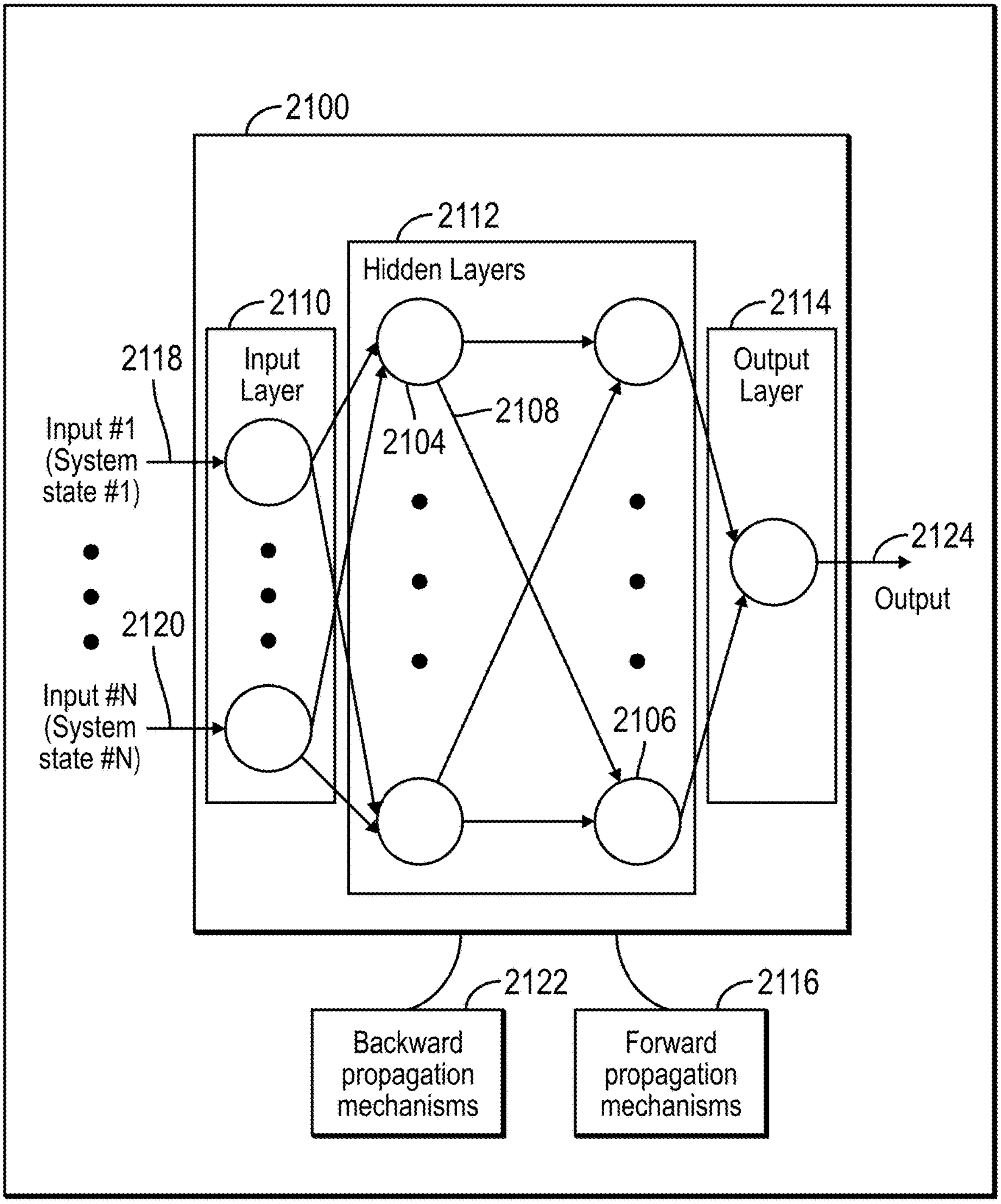
FIG. 21 illustrates, in a block diagram, details of a machine learning model in accordance with certain embodiments.

FIG. 21 illustrates, in a block diagram, details of a machine learning model 2100 in accordance with certain embodiments. FIG. 21 illustrates, in a block diagram, details of a machine learning model 2100 in accordance with certain embodiments. In certain embodiments, the machine learning models 130 220 are implemented using the components of the machine learning model 2100.

The machine learning model 2100 may comprise a neural network with a collection of nodes with links connecting them, where the links are referred to as connections. For example, FIG. 21 shows a node 2104 connected by a connection 2108 to the node 2106. The collection of nodes may be organized into three main parts: an input layer 2110, one or more hidden layers 2112, and an output layer 2114.

The connection between one node and another is represented by a number called a weight, where the weight may be either positive (if one node excites another) or negative (if one node suppresses or inhibits another). Training the machine learning model 2100 entails calibrating the weights in the machine learning model 2100 via mechanisms referred to as forward propagation 2116 and backward propagation 2122. Bias nodes that are not connected to any previous layer may also be maintained in the machine learning model 2100. A bias may be described as an extra input of 1 with a weight attached to it for a node.

In forward propagation 2116, a set of weights are applied to the input data 2118 . . . 2120 to calculate the output 2124. For the first forward propagation, the set of weights may be selected randomly or set by, for example, a system administrator. That is, in the forward propagation 2116, embodiments apply a set of weights to the input data 2118 . . . 2120 and calculate an output 2124.

In backward propagation 2122 a measurement is made for a margin of error of the output 2124, and the weights are adjusted to decrease the error. Backward propagation 2122 compares the output that the machine learning model 2100 produces with the output that the machine learning model 2100 was meant to produce, and uses the difference between them to modify the weights of the connections between the nodes of the machine learning model 2100, starting from the output layer 2114 through the hidden layers 2112 to the input layer 2110, i.e., going backward in the machine learning model 2100. In time, backward propagation 2122 causes the machine learning model 2100 to learn, reducing the difference between actual and intended output to the point where the two come very close or coincide.

The machine learning model 2100 may be trained using backward propagation to adjust weights at nodes in a hidden layer to produce adjusted output values based on the provided input data 2118 . . . 2120. A margin of error may be determined with respect to the actual output 2124 from the machine learning model 2100 and an expected output to train the machine learning model 2100 to produce the desired output value based on a calculated expected output. In backward propagation, the margin of error of the output may be measured and the weights at nodes in the hidden layers 2112 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 2100 is configured to repeat both forward and backward propagation until the weights of the machine learning model 2100 are calibrated to accurately predict an output.

The machine learning model 2100 implements a machine learning technique such as decision tree learning, association rule learning, artificial neural network, inductive programming logic, support vector machines, Bayesian models, etc., to determine the output 2124.

In certain machine learning model 2100 implementations, weights in a hidden layer of nodes may be assigned to these inputs to indicate their predictive quality in relation to other of the inputs based on training to reach the output 2124.

With embodiments, the machine learning model 2100 is a neural network, which may be described as a collection of "neurons" with "synapses" connecting them.

With embodiments, there may be multiple hidden layers 2112, with the term "deep" learning implying multiple hidden layers. Hidden layers 2112 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 2116 and the backward propagation 2122.

In backward propagation 2122, embodiments measure the margin of error of the output and adjust the weights accordingly to decrease the error.

Neural networks repeat both forward and backward propagation until the weights are calibrated to accurately predict the output 2124.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method, comprising operations for:

receiving selection of a trace;

associating the trace with raw log lines;

identifying a trace category of the trace, wherein the trace category is associated with a common log lines template, wherein the common log lines template comprises log lines common to a plurality of logs that correspond to a plurality of traces;

generating common log lines by removing log lines from the raw log lines that do not appear in the common log lines template;

identifying one or more relevant trace categories by comparing the trace with representative traces of a plurality of other trace categories;

identifying one or more relevant traces by comparing the trace with other traces in a same trace category;

identifying a problem using the trace, the common log lines, the one or more relevant trace categories, and the one or more relevant traces; and implementing a solution for the problem.

2. The computer-implemented method of claim 1, wherein the operations for the identifying the trace category comprise:

encoding the trace into a vector; and comparing the vector of the trace with vectors of representative traces of a plurality of trace categories, wherein the trace is identified as being in the trace category when a distance between the vector of the trace and a vector of a representative trace of the trace category is less than a distance threshold.

3. The computer-implemented method of claim 1, wherein the operations for the identifying the one or more relevant traces comprise:

encoding the trace into a vector; and comparing the vector of the trace with vectors of the other traces in the same trace category, wherein a particular trace is identified as being relevant to the trace when a distance between the vector of the trace and the vector of the particular trace is less than a distance threshold.

4. The computer-implemented method of claim 1, wherein the operations for the identifying the one or more relevant trace categories comprise:

encoding the trace into a vector;

encoding the representative traces of the plurality of other trace categories into vectors; and comparing the vector of the trace with the vectors of the representative traces, wherein a particular trace category is identified as being relevant to the trace when a distance between the vector of the trace and a vector of a representative trace of that particular trace category is less than a distance threshold.

5. The computer-implemented method of claim 1, wherein the operations further comprise:

associating common log lines of each trace in the trace category as a log lines segment list;

generating a common log lines segment list from the log lines segment list; and generating the common log lines template from the common log lines segment list.

6. The computer-implemented method of claim 5, wherein the operations further comprise:

tokenizing the log lines in the common log lines segment list to generate tokens;

for each of the tokens that occurs in a number of the common log lines segment list that is less than a token threshold, replacing that token with a placeholder; and generating the common log lines template from the tokens and each placeholder.

7. The computer-implemented method of claim 1, wherein the operations further comprise:

encoding each trace of the plurality of traces into a vector;

comparing the vectors of each trace of the plurality of traces; and based on the comparing, forming a plurality of trace categories by grouping the traces of the plurality of traces, wherein a first trace and a second trace are grouped into a particular trace category when a distance between the vector of the first trace and the vector of the second trace is less than a distance threshold.

8. A computer program product comprising:

one or more computer-readable storage media; and program instructions stored on the one or more computer-readable storage media to perform operations comprising:

receiving selection of a trace;

associating the trace with raw log lines;

identifying a trace category of the trace, wherein the trace category is associated with a common log lines template, wherein the common log lines template comprises log lines common to a plurality of logs that correspond to a plurality of traces;

generating common log lines by removing log lines from the raw log lines that do not appear in the common log lines template;

identifying one or more relevant trace categories by comparing the trace with representative traces of a plurality of other trace categories;

identifying one or more relevant traces by comparing the trace with other traces in a same trace category;

identifying a problem using the trace, the common log lines, the one or more relevant trace categories, and the one or more relevant traces; and implementing a solution for the problem.

9. The computer program product of claim 8, wherein the operations for the identifying the trace category comprise:

encoding the trace into a vector; and comparing the vector of the trace with vectors of representative traces of a plurality of trace categories, wherein the trace is identified as being in the trace category when a distance between the vector of the trace and a vector of a representative trace of the trace category is less than a distance threshold.

10. The computer program product of claim 8, wherein the operations for the identifying the one or more relevant traces comprise:

encoding the trace into a vector; and comparing the vector of the trace with vectors of the other traces in the same trace category, wherein a particular trace is identified as being relevant to the trace when a distance between the vector of the trace and the vector of the particular trace is less than a distance threshold.

11. The computer program product of claim 8, wherein the operations for the identifying the one or more relevant trace categories comprise:

encoding the trace into a vector;

encoding the representative traces of the plurality of other trace categories into vectors; and comparing the vector of the trace with the vectors of the representative traces, wherein a particular trace category is identified as being relevant to the trace when a distance between the vector of the trace and a vector of a representative trace of that particular trace category is less than a distance threshold.

12. The computer program product of claim 8, wherein the operations further comprise:

associating common log lines of each trace in the trace category as a log lines segment list;

generating a common log lines segment list from the log lines segment list; and generating the common log lines template from the common log lines segment list.

13. The computer program product of claim 12, wherein the operations further comprise:

tokenizing the log lines in the common log lines segment list to generate tokens;

for each of the tokens that occurs in a number of the common log lines segment list that is less than a token threshold, replacing that token with a placeholder; and generating the common log lines template from the tokens and each placeholder.

14. The computer program product of claim 8, wherein the operations further comprise:

encoding each trace of the plurality of traces into a vector;

comparing the vectors of each trace of the plurality of traces; and based on the comparing, forming a plurality of trace categories by grouping the traces of the plurality of traces, wherein a first trace and a second trace are grouped into a particular trace category when a distance between the vector of the first trace and the vector of the second trace is less than a distance threshold.

15. A computer system comprising:

a processor set;

one or more computer-readable storage media; and program instructions stored on the one or more computer-readable storage media to cause the processor set to perform operations comprising:

receiving selection of a trace;

associating the trace with raw log lines;

identifying a trace category of the trace, wherein the trace category is associated with a common log lines template, wherein the common log lines template comprises log lines common to a plurality of logs that correspond to a plurality of traces;

generating common log lines by removing log lines from the raw log lines that do not appear in the common log lines template;

identifying one or more relevant trace categories by comparing the trace with representative traces of a plurality of other trace categories;

identifying one or more relevant traces by comparing the trace with other traces in a same trace category;

identifying a problem using the trace, the common log lines, the one or more relevant trace categories, and the one or more relevant traces; and implementing a solution for the problem.

16. The computer system of claim 15, wherein the operations for the identifying the trace category comprise:

encoding the trace into a vector; and comparing the vector of the trace with vectors of representative traces of a plurality of trace categories, wherein the trace is identified as being in the trace category when a distance between the vector of the trace and a vector of a representative trace of the trace category is less than a distance threshold.

17. The computer system of claim 15, wherein the operations for the identifying the one or more relevant traces comprise:

encoding the trace into a vector; and comparing the vector of the trace with vectors of the other traces in the same trace category, wherein a particular trace is identified as being relevant to the trace when a distance between the vector of the trace and the vector of the particular trace is less than a distance threshold.

18. The computer system of claim 15, wherein the operations for the identifying the one or more relevant trace categories comprise:

encoding the trace into a vector;

encoding the representative traces of the plurality of other trace categories into vectors; and comparing the vector of the trace with the vectors of the representative traces, wherein a particular trace category is identified as being relevant to the trace when a distance between the vector of the trace and a vector of a representative trace of that particular trace category is less than a distance threshold.

19. The computer system of claim 15, wherein the operations further comprise:

associating common log lines of each trace in the trace category as a log lines segment list;

generating a common log lines segment list from the log lines segment list; and generating the common log lines template from the common log lines segment list.

20. The computer system of claim 19, wherein the operations further comprise:

tokenizing the log lines in the common log lines segment list to generate tokens;

for each of the tokens that occurs in a number of the common log lines segment list that is less than a token threshold, replacing that token with a placeholder; and generating the common log lines template from the tokens and each placeholder.

* * * * *